United States Patent
Lamb

(10) Patent No.: US 8,782,404 B2
(45) Date of Patent: Jul. 15, 2014

(54) SYSTEM AND METHOD OF PROVIDING TRUSTED, SECURE, AND VERIFIABLE OPERATING ENVIRONMENT

(76) Inventor: Nicholas L. Lamb, Odenton, MD (US)

( * ) Notice: Subject to any disclaimer, the term of this patent is extended or adjusted under 35 U.S.C. 154(b) by 359 days.

(21) Appl. No.: 12/876,688

(22) Filed: Sep. 7, 2010

(65) Prior Publication Data

US 2012/0060030 A1    Mar. 8, 2012

(51) Int. Cl.
*H04L 29/06*    (2006.01)

(52) U.S. Cl.
USPC .......... 713/166; 713/182; 726/5; 726/9; 726/16

(58) Field of Classification Search
None
See application file for complete search history.

(56) References Cited

U.S. PATENT DOCUMENTS

| | | | |
|---|---|---|---|
| 2007/0118745 A1* | 5/2007 | Buer | 713/168 |
| 2007/0223685 A1* | 9/2007 | Boubion et al. | 380/2 |
| 2008/0148364 A1* | 6/2008 | Hopen et al. | 726/4 |
| 2010/0199089 A1* | 8/2010 | Vysogorets et al. | 713/168 |
| 2010/0205667 A1* | 8/2010 | Anderson et al. | 726/19 |

* cited by examiner

*Primary Examiner* — Shewaye Gelagay
(74) *Attorney, Agent, or Firm* — Staas & Halsey LLP

(57) ABSTRACT

A method and system of synergizing hardware, firmware, software, and useful feature(s) into a trusted, secure, and verifiable operating environment (TSVOE) that is critical for businesses and consumers that rely on information technology products and/or services. Such products provide various capabilities such as protecting the corporate infrastructure from attack, protecting the client from attack, designing a customizable operating schema, advanced validation of client authentication, establishing a clean environment within a dirty environment, etcetera. Moreover, by ensuring that operating environment security is achieved, a product can provide guarantees that modern state-of-the-art systems cannot. Finally, diversification of hardware, software, firmware, and features creates robust products.

18 Claims, 11 Drawing Sheets

13a

13b

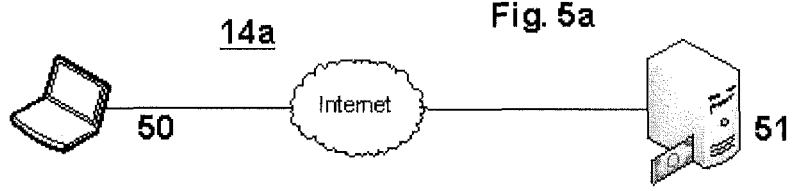
Fig. 5a
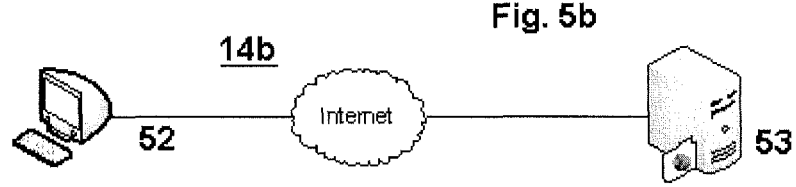
Fig. 5b
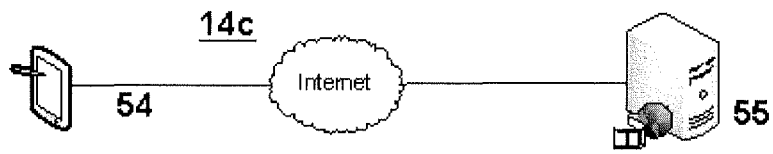
Fig. 5c
Fig. 5d
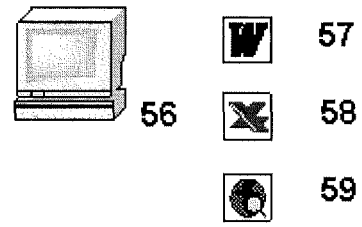

SYSTEM AND METHOD OF PROVIDING TRUSTED, SECURE, AND VERIFIABLE OPERATING ENVIRONMENT

FIELD

Various embodiments described herein related to a system, method and a device-readable medium enabling a trusted, secure and verifiable operating environment (TSVOE).

BACKGROUND

Several concepts within the field and problems associated therewith are introduced and discussed below in no particular order.

There is the notion of a LiveCD. A LiveCD is a bootable compact disc (CD) containing all of the code necessary to boot a regular operating system on a computer or similar device that may not have a hard drive (or other storage hardware) available for permanent storage. LiveCD technology is also used to recover a copy of an operating system that resides on the permanent storage hardware within a computer or similar device but is damaged, corrupted, or otherwise inaccessible through normal operation. Another typical use for LiveCD technology is to initialize a temporary operating system for experimental purposes such as testing it in a trial-mode before buying or installing a final copy of the operating system. Typical configurations of LiveCD and similar Live-Media and other technologies tend to include as many applications, services, and/or features as possible for convenience to clients. However, the more of these capabilities included natively within the hardware, firmware, and/or software components, the greater the potential for vulnerabilities and other security issues.

There is the concept of virtualization. Virtualization is generally the capability for multiple different operating systems to coexist on the same hardware simultaneously. For example, a computer hardware system can have two instances of a particular vendor's operating system and a separate instance of a different vendor's operating system functioning at the same time. These virtual environments, depending on their configuration, may be aware of each other or can be restricted to only know about their individual instance. However, simply utilizing virtualization technology cannot guarantee the valid operation of the virtual environment. For example, an attacker that executes a malicious code at the virtualization management layer (or lower) can defeat all the security protections afforded by a virtualized environment.

Another concept is that of utilizing Secure Sockets Layer (SSL) or similar communications protocol for encrypted web browsing and similar activities. While this protocol and a similar one called Transport Layer Security (TLS) support client authentication, it is industry practice to only validate the server end of the communication channel. This is the traditional operation because distribution of unique authentication key information to one-time-use clients is extremely time consuming, technically difficult, potentially costly, etc. Moreover, client authentication only marginally increases the security of the communication channel, if it improves security at all. The main benefit of SSL and similar technologies is that the client can be relatively certain that the server-end of the communication channel is who they expect it to be and that all communications over the connection are encrypted to protect against eavesdropping. However, an attacker who has software running within the systems at either end of the communication channel can trivially read all information that transits this communication channel before and/or after transmission or reception.

Another concept is that of multi-factor user authentication. Traditionally, multi-factor authentication measures any two or all three of: something you have, something you know, and/or something you are. Something you have could be a piece of hardware such as a credit card. Something you know could be a personal identification number (PIN) or password. Lastly, something you are could be a physical trait like a fingerprint, which would ideally be unique for each client. While this can provide a level of client authentication, it is insufficient insomuch as it relies on an honest, trustworthy individual. A fingerprint can be attained from a doorknob or a drinking glass at a restaurant. A PIN can be recorded via a video capture device. A credit card can be physically stolen. Thus, even if all three factors were imposed to authenticate a client, a single adversary can defeat this security posture by employing the tactics described above.

Another concept is that of a hardened host. A hardened host is a specific system configuration, usually done in software, which reduces the potential attack surface of the host. This can be achieved by removing unneeded applications, turning off unused services, configuring firewall rules, enabling SELinux (on supported Linux-based systems), etc. While there is less potential for weaknesses and vulnerabilities, some services and many applications will remain enabled and activated within the system. These services and applications are still subject to any exploits that were developed against those components, thus exposing even a hardened host to attack.

While this is not an exhaustive list of typical security-related technologies and products, this represents many branches that the industry has taken to address security concerns. There are several flaws that these technologies contain, whether operating individually or bundled together. The following demonstrates a non-exhaustive list of disadvantages that these and related industry products may contain.

The above mentioned and other similar technologies generally trust the human invoking and utilizing the operating environment. While most users may not be malicious, some undoubtedly are. Some examples of these are hackers, scammers, phishers, terrorists, disgruntled employees, unsatisfied customers, etc. Since, for the most part, the owner of a computing system is the client, most service providers are at the will of the client to behave appropriately. It is very difficult, if not impossible, for a service provider to control every client that may try to access the corporate systems and infrastructure. This is specifically true in the case where the client is really an attacker who may only acquire client status as a method of accessing corporate resources.

Another flaw is that these and other similar technologies implicitly and/or explicitly trust most, if not all, of the hardware within the client's operating environment. These hardware components include: network cards, processors, hard drives, keyboards, removable storage devices, the BIOS, etc. While this is not an exhaustive list of the hardware components available within most modern systems, nearly all products (whether security products or regular applications) trust the hardware to act in a good-faith manner. However, hacker, malware, organized crime, and other actors are becoming ever more sophisticated. Hackers have trivially demonstrated the capability of corrupting nearly every hardware, firmware, and software component within modern computers, cell phones, PDAs, and similar devices. For example, at several recent BlackHat conferences, hackers have demonstrated the ability to rewrite the Basic Input/Output System (BIOS) of various computer systems. The BIOS is so important that if it were to malfunction the entire system could be unusable without great time and cost to the owner. Moreover, the recovery of the system generally requires returning the computing system to the manufacturer for repair. As demonstrated at BlackHat, a crafty hacker could write remote control code into a system's BIOS and gain permanent access to the system even if the system's hard disk, processor, random access memory (RAM), DVD-ROM, and network card were all replaced with known good hardware components.

Another issue that these and other similar technologies have a tendency to share in common is that they are tailored to a specific use. That is, they are generally designed for a single purpose and deviations from that purpose either invalidate their security or simply are not possible and would crash or otherwise disable the technology. For instance, a LiveCD is statically configured to provide a specific set of services and cannot be modified without creating an entirely new LiveCD. This process often requires the advanced skills of a computer technician. Additionally, redistribution of this new LiveCD to all clients would be costly, time consuming, and may not be possible within acceptable business constraints.

Another issue is the industry mindset of "security as an afterthought." This practice has become the norm because for most companies profit is the bottom line. Thus, if it costs more to implement security, security will not be implemented. If security causes the product to work more slowly, or otherwise cause discomfort to the client, security will not be implemented. There are many other reasons why security is added to system after the main service of the product is completed. However, as has been shown countless times, the "patching" of products to add security rarely results in a significant improvement of the product's security. In fact, it is often the case that a false sense of security is assumed because a new password box was added, or encryption was used to wrap some critical data, etc. In reality, these new features introduced more areas for hackers and other malicious users to defeat the system and go undetected.

Another drawback of these and other similar services and technologies is that they are typically designed for a single operating environment. For instance, they may operate on the local hardware system as either a stand-alone environment or a remote access client, but are incapable of switching between various modes. Additionally, many of these technologies require an active network connection, which is usually an Internet connection, to download updates, access configuration information, etc. For a product designed for stand-alone mode, this could be very difficult if not impossible (depending on the configuration of the system).

Another shortcoming of the aforementioned technologies is their ability to unintentionally or intentionally access the client's personal data with our without the client's consent. This can lead to data corruption and if a client does not have a backup of the data it could be lost forever. Additionally, it could lead to leak of information that the client does not intend to share with others and could violate privacy laws.

Not necessarily every product or service in existence suffers from all the above listed disadvantages. However, current products or services suffer from at least one security flaw or other operational disadvantage including those that are not discussed herein in detail. Moreover, most product vendors and service providers intentionally cover-up instances of security weaknesses as it would undoubtedly hurt their corporate image. Lastly, other issues exist that weaken the trust, security, or verifiability of these devices and samples of these issues will be discussed when appropriate.

Although some types of security technologies are available, there is a need for a system and method that addresses the above and other weaknesses of existing security technologies.

SUMMARY

In accordance with one embodiment, a trusted, secure, and verifiable operating environment is comprised of various hardware, firmware, software, and/or features configured in a defense-in-depth architecture and manufactured to defeat many security weaknesses including those inherent in modern products while providing a maximum number of form factors and services as to provide clients with ease-of-use.

Objects and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIGS. 5a, 5b and 5c illustrate embodiments operating in a remote-client mode.

FIG. 5d illustrates an embodiment operating in a local-client mode.

DETAILED DESCRIPTION OF THE EMBODIMENTS

Figure 1A:
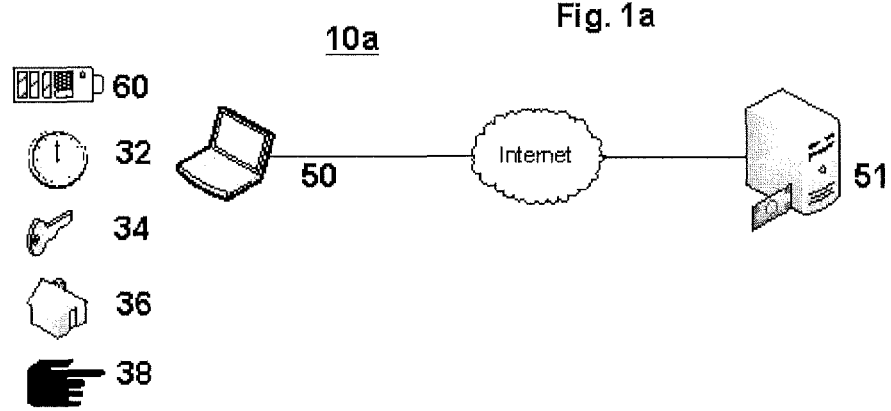
FIGS. 1a, 1b, and 1c illustrate various systems containing a remote access client with a valid enhanced multi-factor authentication and a service provider.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate. As used herein words importing the singular shall include the plural and vice versa unless specifically counter indicated.

Various advantages of embodiments are described herein in no particular order or ranking and none should be construed as exhaustive and preferable method over the others. Additionally, although not required, several of these advantages may be deployed within any single embodiment thus providing greater defense-in-depth. Reuse of these various advantages to create different combinations is anticipated and recommended. Each advantage will be given a feature identifier starting with the letter A and continuing through the American English alphabet. These feature identifiers will be acknowledged by the use of "feature A", "feature B", etc. when they are used within particular embodiments. This is included so that redefining the specific use of each feature will not be necessary. For instance, enhanced multi-factor client authentication will be described once but used within many embodiments. The principle of each identified feature will be the same unless specifically mentioned otherwise.

One embodiment treats the user utilizing an operating environment as untrusted. This means that an embodiment anticipates that a user may intentionally or unintentionally attempt to weaken the operating environment integrity. By functioning in this mode of operation, an embodiment can take certain precautions to ensure such actions would not defeat all security implementations enforced within the embodiment. This will be further referenced as feature A.

Figure 4A:
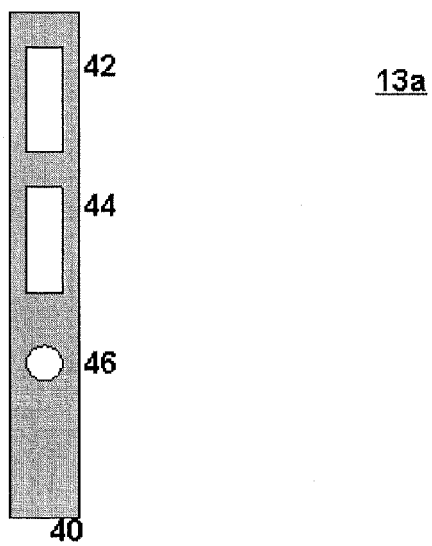
FIGS. 4a and 4b illustrate side views of a PCI device containing sample redundant hardware component(s).
Figure 4B:
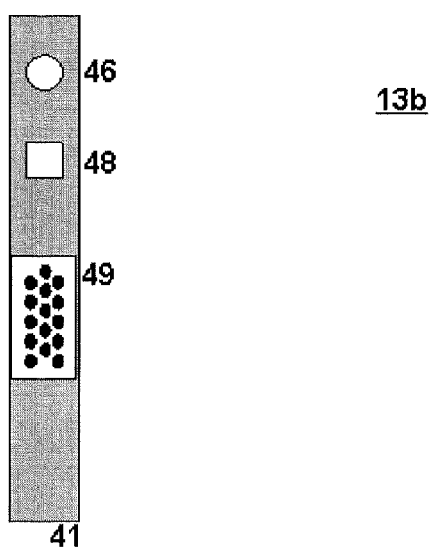

Another embodiment contains redundant component(s) for of some or all critical hardware necessary to carry out, in part or whole, the main task(s) assigned to a particular configuration. For example, an embodiment includes a PCI device (41) containing a wireless network interface card 46, a Bluetooth™ receiver 48, and a 15-pin VGA output port 49 (FIG. 4b—side view). As such, an embodiment provides support such that the standard hardware network interface card would not have to be utilized and video could not be captured by monitoring the primary video card. Another embodiment includes a PCI device (40) which has support for a USB keyboard 42 and/or mouse 44 and a wireless network interface card 46 (FIG. 4a—side view). Such an embodiment greatly reduces the capability for corrupt hardware, firmware, and/or software to successfully implement a key-logger. Generally, a key-logger is a common hacker tool or malware capability that records all keys pressed and the order in which they are pressed with the goal of capturing usernames, passwords, credit card numbers, social security numbers, and/or any other information entered into the system. While particular components are described as examples, the present invention is not limited to any particular component for implementing the invention. For example, various hardware component(s) may be directly configured to communicate with a PCI device or other hardware components may be configured similar to the PCI device to thereby reduce potential vulnerability and other security issues. This is a very short example of the hardware components that can be implemented within various embodiments, and that many other combinations are possible and anticipated. This will be further referenced as feature B.

An embodiment can provide a client with many separate and distinct interface(s), view(s), service(s), and/or resource(s). That is, the various possible embodiments do not necessarily restrict the client to a specific set of operation(s), command(s), application(s), etc. However, each embodiment may be tailored and selectively customized including by a service provider for their client and the interface(s), view(s), service(s), and/or resource(s) can be changed based upon the policies and restrictions agreed to by the service provider and their client (FIGS. 5a, 5b, 5c and 5d). However, an embodiment can restrict a client to specific operations as required by the service provider, with or without the agreement of their client. In such a case, it would be up to the discretion of the client as to whether their use of this embodiment is acceptable or not. Individual corporate entities, service providers, etc. can selectively specify their own restriction(s) without restricting other embodiments. This will be further referenced as feature C.

Figure 6A:
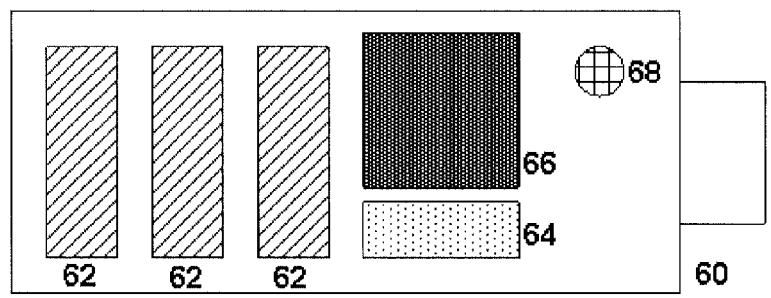
FIG. 6a illustrates a front view of a USB device configured with trusted, secure, and verifiable embedded component(s).
Figure 6B:
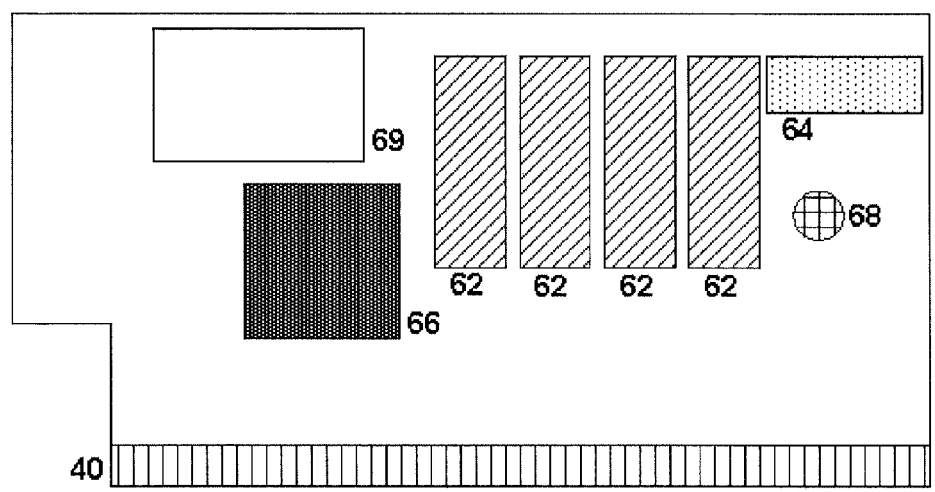
FIG. 6b illustrates a front view of a PCI device configured with trusted, secure, and verifiable embedded component(s).

An embodiment can treat security as the critical component. That is, the architecture establishes a verifiably secure operating foundation upon which additional feature(s), service(s), etc. can be leveraged (FIGS. 6a and 6b). By avoiding makeshift hardware and/or software modification(s) to fix security issues within an embodiment, the underlying security mechanisms will remain intact. Moreover, an attacker would not be able to modify the hardware, firmware, or software security components of an embodiment without being detected. This ensures that from each embodiment's startup to shutdown, only trusted, secure, and verifiable operations are carried out. This will be further referenced as feature D.

Figure 7:
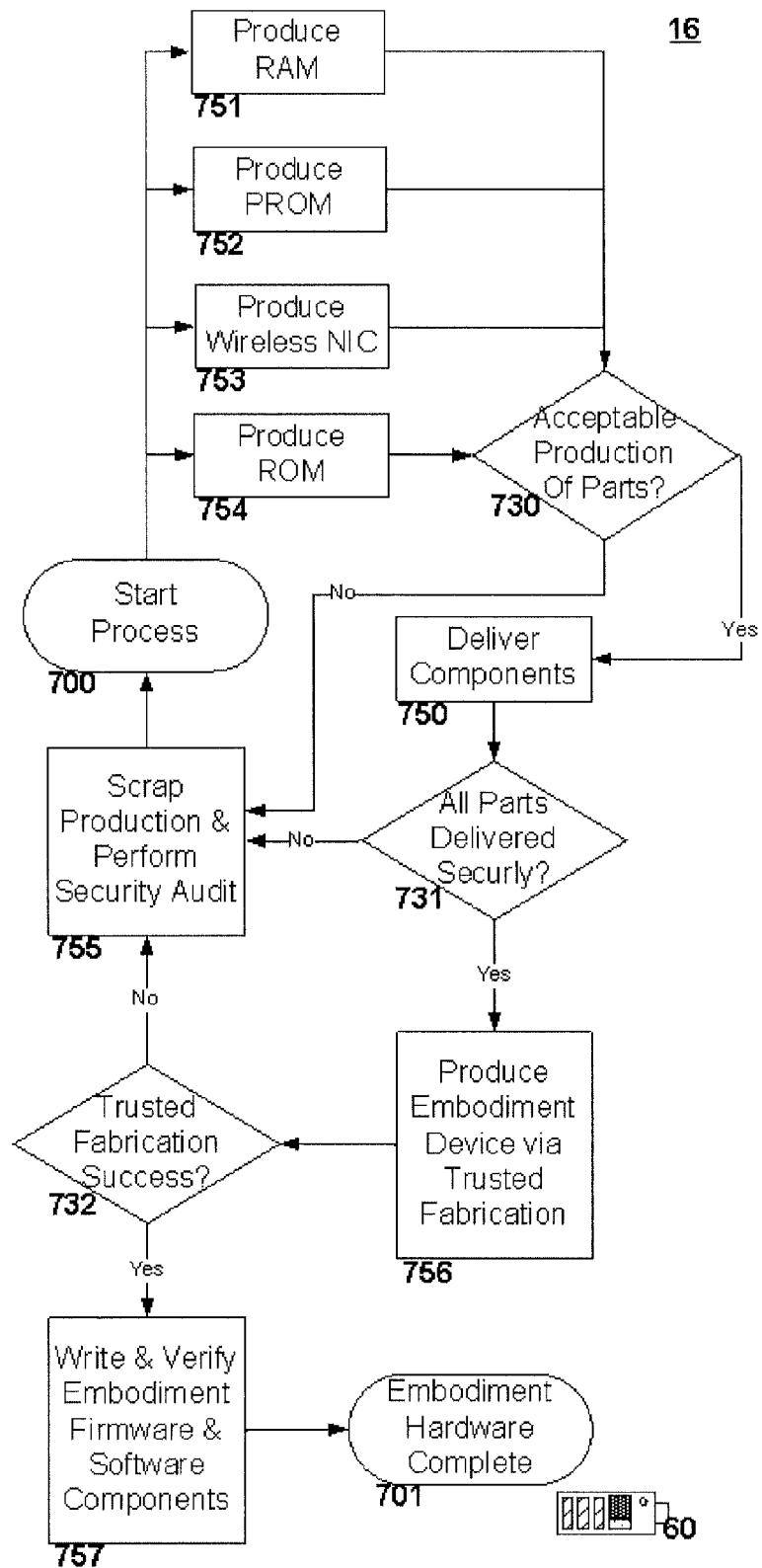
FIG. 7 is a flow diagram demonstrating a process of producing a USB device through a trusted fabrication process.

Entities, for example, a country, generally has a concept of trusted fabrication (FIG. 7). Put another way, there is a general expectation that others including companies within their jurisdiction will produce products in the host country's best interest. Trusted fabrication is a strict manufacturing process whereby a high level of trust in the manufacturer can be guaranteed by the customer. This includes both quality of hardware goods constructed (such as processors, memory chips, etc.) and software/firmware goods (such as operating system code, security kernel code, drivers, etc.). It is anticipated that some or all hardware, firmware, and/or software components will be produced within a jurisdictional boundary by a trusted manufacturer or developer. Certain components such as raw metals, plastic or metal coverings, and other non-critical parts can be fabricated in bulk and distributed to regional facilities for assembly without sacrificing the trust, security, and/or verification of the specific embodiment. In many cases various hardware, firmware, and/or software architectures will generally remain the same between jurisdictional boundaries. In such cases the manufacturers within these various jurisdictions will be the agents tasked with ensuring trusted fabrication. Individual embodiments can have different requirements for trusted fabrication and the restrictions imposed within one embodiment do not limit or restrict any other separate embodiment. Moreover, no embodiment is required to implement a specific subset of hardware, firmware, and/or software trusted-fabrication. More information regarding trusted fabrication can be found at the world wide web using universal resource locator at: sandia.gov/mstc/trusted/fabrication.html, however, embodiments described herein are not limited thereto. This will be further referenced as feature E.

Figure 3A:
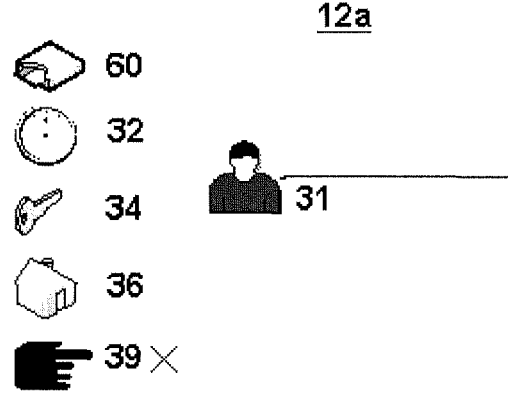
FIGS. 3a, 3b, and 3c illustrate various implementations of detection of an unauthorized access attempt by an untrusted client.
Figure 3A:
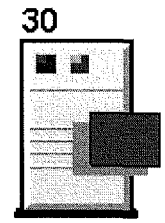
Figure 3B:
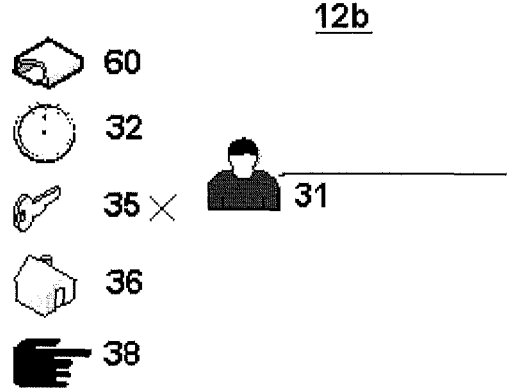
Figure 3B:
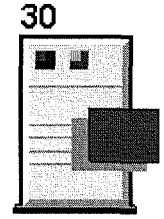
Figure 3C:
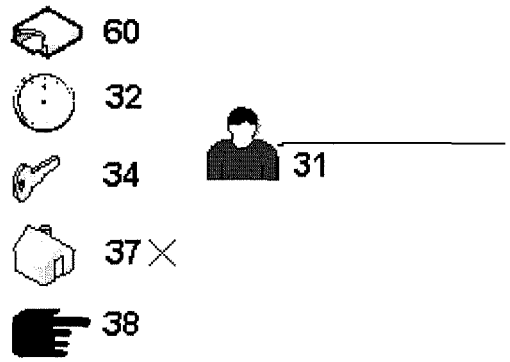
Figure 3C:
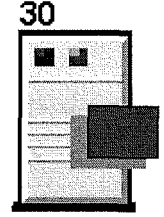

Another embodiment capability is that of enhanced multi-factor client authentication (FIGS. 3a, 3b, and 3c). The current factors available within enhanced multi-factor authentication include those described above in the multi-factor authentication paragraph which include: something you have, something you know, and something you are. There are currently four additional factors that makeup enhanced multi-factor authentication including: somewhere you are, when you are, what role you are, and why you are. Somewhere you are is a test that can be satisfied, for example, by checking the client's Internet Protocol (IP) address, performing geo-location validation, by requiring a client to show up to a predefined physical location, etc., or any identifier that can be used to verify a location of a request. When you are is a test of the date and/or time a client is attempting to operate a particular embodiment. What role you are is a test that can be satisfied by checking the client's role (CEO, software developer, etc.). Why you are is a test that can be satisfied by having the client enter (or select from a predefined list) the reason they are accessing the embodiment (routine, emergency, etc.). Any combination of one or more enhanced multi-factor authenticators for client authentication are possible and those chosen by one embodiment do not limit or restrict any other separate embodiment. Additional authentication factors that exist in the future may be incorporated as potential authenticators as appropriate. This will be further referenced as feature F.

Another advantage is that different embodiments can have dissimilar hardware, firmware, and software implementations (FIG. 4a, 4b, 6b). This provides several benefits. One such benefit is that a client is not tied in to a specific hardware environment. As an example, a LiveCD would be a useless technology for a cell phone as there is no such interface for a cell phone to natively read data from a CD. Another embodiment can be designed and implemented utilizing a company's existing technical staff. As an example, if Company A has a technical staff with experience programming Universal Serial Bus (USB) devices then Company A can release a USB-based embodiment to their clients (FIGS. 6a and 7). Individual embodiments are not tied to specific hardware, firmware, and/or software implementations and no embodiment can impose or imply any restrictions on any other embodiment. This will be further referenced as feature G.

The various embodiments can be customized for a particular use case (FIGS. 5a, 5b, 5c and 5d). These include operating in a local operating environment, operating as a client, operating as a server, operating as an infrastructure device, or operating as a member of a cluster. This overcomes the functional weakness of most products that are designed to only operate in particular modes (e.g., local operating environment only as stand-alone, etc.). This will be further referenced as feature H.

Each embodiment can present to a client restricted sets of applications and permissions as determined by the service provider. This schema provides reasonable assurance that a client utilizing a particular embodiment cannot use the operating environment to launch attacks against the service provider. That is, as long as the tools necessary to attack the service provider's infrastructure are not provided by the service provider within their embodiment, these required attack tools cannot be utilized. This will be further referenced as feature I.

Another advantage is that different embodiments can have different access and storage right(s) including with respect to local computing hardware device(s). For example, if storing data to the local computer's system is forbidden by the service provider's policy, an embodiment can be customized to prevent the detecting and/or mounting of hard disks and other permanent storage devices. This can be accomplished in several ways. For example, the driver(s) necessary to communicate with those type(s) of device(s) can be removed from the operating system loaded by the embodiment. Alternatively, the hardware interrupts associated with the various forbidden storage devices can be ignored by the embodiment's operating system. These restrictions provide several potential benefits. If the client does not want to put their personal data at risk, an embodiment that does not have access to those storage devices cannot read, modify, delete, or damage any of this information. Further, a service provider that does not trust a client's data can prevent their embodiment from using any of that information. These and similar operating restrictions are different based upon the operating system utilized by the environment and no embodiment's configuration shall impose restrictions on any other embodiment. This will be further referenced as feature J.

The next advantage discussed is that of uniform operating environments. Once an embodiment is configured, no matter where the authorized client activates and utilizes their services, the client could have the exact same operating environment as any other time the client accesses this embodiment. This may be achieved without requiring the client to possess a network connection. However, if the service provider desires, changes to an embodiment can be pushed to the client through several means including: upgrading over a network connection, upgrading by visiting a kiosk, upgrading by swapping a memory card inserted in an Upgrading Memory Interface (69) within a Sample TSVOE PCI Device (40) as shown in FIG. 6b, exchanging an embodiment for a different one at a predetermined storefront or location, etc. This will be further referenced as feature K.

An embodiment can be used for many tasks that have traditionally been considered closed systems. Generally, closed systems are infrastructure elements that are supposed to be inaccessible from the Internet or the general public. Many of these closed systems are identified by a government as Critical Infrastructures. A non-exhaustive list of U.S. Critical Infrastructure's that can be secured by utilizing various embodiments include: banking & finance, electrical power systems, water supply systems, emergency services, telecommunications, continuity of government, and transportation. A non-exhaustive list of non-Critical Infrastructure elements that are closed systems can include: closed-circuit security camera systems, corporate networks, grocery store shipping infrastructures, payroll systems, etc. By restricting access to these various systems and infrastructures via an embodiment, these important resources can be secured against remote adversaries. Additionally, attacks caused by insider threat can be drastically reduced if a dual, tri, quad, etc. set of users with their individual/personal/group embodiments are required to access and change important settings within these environments. This will be further referenced as feature L.

The aforementioned samples are of various individual features that may be included in the various embodiments described herein in detail. The features identified should not be considered an all-inclusive list of the various advantages available within an embodiment and numerous other combinations and features are anticipated. Additionally, it is not required, nor expected, that each embodiment implement all of the features listed above. Moreover, it is specifically anticipated that cost factors would preclude various embodiments from containing a large number of these features. Implementing more of these features within a particular embodiment, however, provides higher levels of trust, security, and verifiability. It is expected that certain embodiments may contain only one feature while other embodiments may contain many or all of them as well as additional features not listed above.

Lastly, as commonly indicated, no embodiment configuration shall impose any restrictions on any other embodiment.

An embodiment can implement feature A (client treated as untrusted). Many systems available in the marketplace today are geared towards giving the most flexibility to the client. Moreover, the systems implicitly or explicitly trust the client. This means a high degree of power and control of the system is granted to the client. An example of the implicit trust of the client leading to a security incident was the attacks against the PlayStation™ 3 system. A hacker was able to reprogram a PlayStation™ 3 to act as a regular computer. Additionally, he was able to take full control of the hardware and could use it to steal intellectual property and/or other data. This occurred because of the failure to implement defense measures that would limit the client's access to critical system hardware and software.

An embodiment deploying feature A would provide the client with little access that would enable the client to attempt to circumvent the features offered to the client by this embodiment. This is required in order to provide a high level of confidence that the embodiment is consistently functioning in a trusted, secure, and verifiable manner. To achieve this requirement, the embodiment must limit the client's access to hardware, firmware, and software components. This can include, for example, limiting the application(s) and capability(ies) the client can access within the embodiment's user interface. It may also include removing debugging code, maintenance code, and/or hardware debugging features. According to an embodiment, a particular client may be initially configured to have limited access and thereby untrusted, or the client's access could be subsequently adjusted based on usage information obtained subsequent to the client's initial configuration.

An embodiment can implement redundant critical hardware as feature B. Most devices and products rely on the client to have a completely functioning hardware and/or software system in order for their product or service to function properly. Moreover, these devices tend to trust that the hardware and software operating on the client's equipment is trustworthy. Additionally, they tend to have little or no capacity to provide trusted components that would bypass potentially compromised hardware and software. An example of an issue that may occur is the use of LiveCD technology to boot and repair a defective operating system. A hacker that controls any of several hardware components can defeat the security that LiveCD's provide. A hacker who controls the client's hard drive can present false information to the LiveCD operating environment causing it to behave in a manner inconsistent with its normal operating mode. One such misbehavior is to trick the LiveCD operating system into believing there are no hard drives within the client's computing system, thus preventing the LiveCD services from repairing the system.

An embodiment deploying feature B would provide the client with redundant hardware, firmware, and/or software capable of reducing the attack surface. These redundant components could include USB ports for keyboards and mice, Bluetooth™ for wireless devices, local area network (LAN) Ethernet ports, wireless NICs, audio/video/media ports, RAM, processor(s), etc. By implementing any, several, or all of these and/or other redundant components, an embodiment can provide assurance that malicious hardware and/or software within the client's native computing system could not intercept and modify the contents of information transiting the embodiment without being detected.

An embodiment can implement feature C (separate client views). Many devices implement static user interfaces or views for their clients. This uniformity is done because it is cheaper and easier to provide a single look-and-feel than to customize views for millions or billions of people. However, a security concern with standardized views is that an attacker can prepare an attack for a particular operating environment because it is the same for millions and billions of users. An example of this would be the Conficker-series worms that attacked some of the operating systems provided by Microsoft™. Regardless of firewalls, anti-virus software, and other security mechanisms, those attacks defeated most (if not all) systems running susceptible versions of the operating system provided by Microsoft™. More information about the effects of the Conficker worm can be found at the world wide web using universal resource locator at: microsoft.com/security/portal/Threat/Encyclopedia/Entry.aspx?name=Worm%3aWin32%2fConficker.B. While a type of attack is discussed herein, none of the embodiments described herein are limited to addressing a particular type of attack.

An embodiment deploying feature C would implement separate and distinct views for corresponding clients. This provides several benefits including but not limited to benefits specifically set forth herein. One benefit is that analysis for a particular demographic may indicate that group of individuals prefers view X over view Y. Thus, the service provider could deploy view X to those clients. Another benefit is that a one-size-fits-all attack would not work against all embodiments.

An embodiment can implement feature D (security as the critical component). Many devices implement fail-open logic or controls. Fail-open is a concept whereby security is disabled when a security incident occurs. This is done so that interruption of services is minimized.

An embodiment deploying feature D would implement fail-closed logic or controls. Fail-closed means that if a security incident occurs, the device would disable itself until the security incident is rectified. This implies that many, if not all, services will be disabled to maintain the trust, security, and verifiability of the embodiment. Feature D may also require that an embodiment implement a security framework before loading other customized features (such as web browser support, word processing support, etc.). Other mechanisms can be loaded within the security framework, but not in place of it. An example of a security framework freely available in the marketplace is SELinux. SELinux stands for "Security Enhanced Linux." SELinux was developed, primarily, by the United States National Security Agency and released to the public in late 2000. Further information on use of SELinux as one potential component used to implement portions of feature D can be found at the world wide web using universal resource locator at: nsa.gov/research/selinux/. While SELinux is provided as a specific example of a component, the present invention is not limited thereto.

An embodiment can implement feature E (trusted fabrication). Most product vendors operate on a standard business model of maximizing profits. As such, many tend to go with the cheapest cost hardware and software. Oftentimes this means utilizing services from China, Taiwan, and other countries where quality and trust of goods is lacking. This can lead to numerous security issues. First, a manufacturer could produce products below specifications. This can lead to information leaks or the exposure of attack avenues for hackers and other malicious entities. For instance, the use of tin versus gold in transistors may cause information transiting one path to leak onto adjacent paths causing glitches. Second, a manufacturer could deliberately implement weakened components in an attempt to reduce credibility in the vendor who supplies the end product to their customers. This may seem counter intuitive; however, it is a form of corporate espionage. After the vendor goes out of business due to loss of reputation, the malicious manufacturer could produce a correct (or competing) product and have a higher control over the market. A third security issue is that an untrusted manufacturer may use fabrication techniques that weaken, reduce, or even eliminate specific security countermeasures that were designed into the original product. That is, they could write backdoor controls that allow anyone with knowledge of this backdoor to gain complete control over the system. This is a non-exhaustive list of potential security weaknesses that are introduced when a product is not manufactured through trusted fabrication.

An embodiment deploying feature E would utilize a trusted fabrication business model whereby a varying level of trust in various components would be ascertainable. A manufacturer would be able to select a fabrication facility within a common jurisdiction such that the weaknesses described above would be illegal and generally avoided. Moreover, a manufacturer selected for trusted fabrication is presumably trusted in some form or other. This can be through a long history or partnership between the manufacturer and the trusted fabricator, because both entities share a common parent company, etc.

An embodiment can implement feature F (enhanced multi-factor authentication). Most product vendors rely on a user-name and password as the authentication mechanism. This provides single-factor authentication (something you know). Others provide two or three factor authentication by requiring either a hardware token (something you have) or a biometric scan (something you are) for two-factor authentication or all three of the aforementioned authenticators to provide strong authentication. For more information about strong authentication visit: the world wide web using universal resource locator at: ffiec.gov/pdf/authentication_guidance.pdf. By limiting authentication to the original three factors of authentication, fraudulent authentication can occur anytime or anywhere.

An embodiment deploying feature F could utilize enhanced multi-factor authenticators. The factors include something you have, something you know, something you are, where you are, when you are, what role you are, and why you are. This provides a much higher level of trust in the authentication mechanism. By limiting the location a client can successfully authorize transactions the likelihood for successful authentication by unauthorized users is substantially reduced. An example of a possible location-based restriction could be the client's home. Thus, if a thief stole an embodiment utilizing enhanced multi-factor authentication utilizing somewhere you are, this unauthorized user would have to come back to the victim's house in order to attempt to successfully authenticate. Similarly, if a client were kidnapped and forced to attempt to authenticate using this embodiment, it would be very unlikely to succeed since the likely location of the kidnapped victim would typically be unauthorized for this client. Moreover, an embodiment deploying feature F could implement a duress code that could be used if the client were under coercion.

A duress code, for example, would serve as an emergency password or PIN that would appear to successfully authenticate the $2^{nd}$ factor authentication (something you know). An example of how this would be useful is as follows. If a client is being held at gunpoint or under similar duress and they met the other factors of authentication, then the person is at a known location. When the person enters their duress authenticator, the system would alert the police or other emergency response personnel. The system could be programmed to hold all authorized and duress tasks for a period of time (for instance, 15 minutes). Thus valid and invalid transactions would take 15 minutes to complete affording the emergency personnel time to respond. This is only one example of the benefits that enhanced multi-factor authentication can provide and certainly other time limits could be implemented. On the other hand, a person attempting to fraudulently use the system would be identified by the emergency personnel responding to the scene. Thus, fraud by legitimate clients would be minimized. Additionally, a client attempting to perpetrate fraud could be identified and criminal or civil legal action could be taken. Another potential use of feature F could be to guarantee delivery of documents, parcels, or other deliverables because a client that successfully authenticates with all factors cannot later repudiate having received the goods. This would be a substantial improvement over anything currently available in the marketplace. There are other uses of feature F such as protecting one from identity theft. The above are sample uses and should not be considered an all-inclusive list. The next paragraph goes into a special use-case of feature F.

Another use of feature F is for counter-terrorism/government use. By handing out embodiments to authorized users, a police, military, government institution, etc. could more easily keep track of the comings and goings of personnel. Moreover, an authorized user at one installation may not have permission to enter other locations and the embodiment would fail the $4^{th}$ factor authenticator (somewhere you are). Thus, if a terrorist or other malicious person was hired at a particular institution and given an embodiment that implements feature F, the person could be denied access to restricted sites with their embodiment. Any attempt would alert authorities who could take action to detain or subdue the target. Moreover, by using an embodiment that implements feature F, authentication can occur far away from friendly forces thus limiting the potential impact to these critical installations. For instance, authentication terminals with mantraps could be stationed outside a critical protection boundary such that an unauthorized user who attempts to detonate a bomb or launch a similar attack would not get close enough to carry out as lethal of an attack. This is one sample counter-terrorism use afforded by feature F but many others exist. Additionally, other features provide counter-terrorism advantages and will be discussed when relevant.

An embodiment can implement feature G (diversified hardware, firmware, and/or software). Many product vendors implement a single product solution. A client may be able to select various elements, colors and perhaps customize the aesthetics of the product by having their name etched onto the surface of the product; however, the hardware, firmware, and software components would likely substantially remain the same. This creates problems when potential clients do not have the required hardware and/or software to utilize the product. An example of this in software is the multitude of products marked "For Microsoft Windows Only." An example of this in hardware is "For PlayStation™ 3 Consoles Only." These force potential clients to invest in yet another product in order to utilize the service they are interested in.

An embodiment deploying feature G could deploy the embodiment in various form factors that utilize different hardware, firmware, and/or software. This would mean that a client could select an embodiment that works for their environment without having to purchase or otherwise obtain additional hardware or software products. An example of this would be deploying an embodiment that provides various hardware implementations like CD, DVD, USB, IEEE 1394, and PCI form factors. A client could select the one that currently works on their computing system. Another example would be deploying an embodiment that provides support for Microsoft operating systems, Apple operating systems, Unix/Linux operating systems, and other operating systems. An additional benefit would be combining both hardware and software diversification into various embodiments. That is, providing embodiments that work within the above listed hardware implementations and within the above listed software implementations. Other combinations are possible and this should not be considered an all-inclusive list of the potential hardware and software implementations that feature G can support. Lastly, these example embodiments containing feature G should not be interpreted as requiring all of the above listed hardware and software implementations, but should be considered as several of the various potential implementations available.

An embodiment can implement feature H (customizable use cases). Many product vendors implement a fixed mode of operation for their products. That limits their robustness and locks the client into a specific operating environment. Purchasing a new product could be required to gain access to alternate usage. For example, a local operating system that has no network support cannot adapt to allow network access. Similarly, a network-aware product may not normally be capable of disabling network access to operate in a secure stand-alone fashion.

An embodiment deploying feature H could dynamically change use cases for the client without requiring the client to perform any special action. This can be useful when a client is mobile and depending on their access location a different suite of tools would be provided. For instance, a client could be a corporate employee who performs monthly inspection of satellite offices. While at the corporate headquarters the client has access to all corporate resources. When visiting a satellite location the client is provided with access to the local information and corporate information related to this location. When working from home or a hotel room, the client may be given local access only and no access to corporate resources. This can be achieved automatically from one embodiment without user involvement. This provides numerous advantages. Among some of the advantages, first, as already mentioned, the client does not have to take any action to switch between the use cases. Second, the client cannot illegitimately access resources from unauthorized locations, thus protecting corporate information. Third, if the computing system the client is using to load the embodiment is compromised or tampered with, there is substantially lower risk to corporate resources. Many other combinations of use cases exist that do not require the client to be a corporate employee.

An embodiment can implement feature I (service provider infrastructure protection). Most corporations that release products to clients put the trust of their corporate infrastructure in perimeter and local (to the corporation) defenses. These include firewalls, intrusion detection/prevention systems, antivirus software, etc. This logic contains numerous flaws. First, it means that little (if any) security enforcement is done at the client-end of the communication channel. Second, it limits security at the service provider's Internet access point and forces security to be scattered throughout the corporate infrastructure. Third, it is costly and difficult to manage. Fourth, it is susceptible to insider threat. Insider threat is the potential for an employee to take action against the corporation from within the security perimeter. Such actions include, but are not limited to, disabling security devices, intentionally introducing viruses/worms/etc. into the corporate environment, allowing unauthorized users onto the premises and/or providing network access to those individuals, etc. Fifth, remote access is not restricted to clients because non-standard or publicly known access methods are used. These are only a few examples of issues that arise when a corporation allows access to the corporate infrastructure and resources from untrusted, insecure, and unverifiable clients. Additional security issues exist because of this weakness.

An embodiment deploying feature I could push the security perimeter all the way to the client. This means that the client could effectively be managed as any other client on the corporate infrastructure while the client is operating this embodiment. This provides numerous benefits. First, all of the above mentioned weaknesses are addressed because only clients with authorized embodiments can establish connections to the corporate infrastructure. Hacker attempts to perform network scans to gain access would be mitigated because only valid connections from valid embodiments would be authorized. Second, the embodiment has a known security configuration and any tampering of the embodiment would invalidate the trust of the operating environment which would fail the verification checks leading to the disabling of the embodiment. Therefore, attempts to hack the corporate infrastructure from within the embodiment are greatly reduced. There are other benefits as well. The next paragraph goes into a special use-case of feature I.

Another use of feature I may be for counter-terrorism use. By handing out systems and methods prescribing to an embodiment to authorized users, a police, military, or government institution could easily maintain records of which client accessed which resources. If a terrorist or other malicious entity attempted to gain unauthorized access to resources by kidnapping individuals with access to those resources, the embodiment could trigger alerts that could perform geolocation services to pinpoint the unauthorized user's location. Moreover, a terrorist that attempts to compromise the integrity of government, military, etc. information would be thwarted. Compromising the integrity could include deletion of logging information, modifying the contents of information, etc. Another benefit is that terrorists would not be able to attack the network infrastructure even with a valid embodiment. This means that if a terrorist infiltrated an organization and had legitimate access to resources, the restrictions within the embodiment set forth by the organization could preclude damaging action (such as sabotage).

An embodiment can implement feature J (restricted access to local hardware). Many products try to adapt to the client's computing system by automatically locating and establishing access methods to all hardware components within the system. This leads to numerous security issues. First, if any of the hardware components contain malicious code, the entire operating environment could be compromised. Second, the malicious hardware components could detect the type of operating environment being loaded, recognize it contains security features, and disable or otherwise corrupt the system preventing services from working whatsoever. Third, certain service providers may wish to limit the client's access to local storage. This can be for several reasons. First, the corporation may not want the client to download and save proprietary information or intellectual property. Once outside the corporate infrastructure and on permanent storage, a hacker or even the clients themselves could sell or otherwise publish the information. Second, the corporation may not want the client to introduce viruses, worms, etc. from the client's local system into the corporate environment.

An embodiment deploying feature J could restrict access to any hardware within the client's computing system. This could be based on policy or dynamically based on an embodiment's perceived threat of the operating environment. For example, an embodiment could disable all permanent storage devices (hard drives, USB Thumb drives, external IEEE 1394 devices, etc.). Another embodiment could disable network access, and another embodiment could disable printers. While specific examples of disabling or ignoring particular instructions or operations are described herein, the present invention is not limited thereto. This addresses all of the concerns mentioned in the previous paragraph. Additionally, this provides at least one additional benefit. A client could not easily learn the inner workings of the embodiment simply by using hacker or other specialized hardware or software to steal the information contained in the protected memory. If any intellectual property, corporate trade secret information or other protected data was contained within an embodiment, the likelihood of an adversary gaining access to that information is substantially reduced.

An embodiment can implement feature K (uniform operating environment). In order for many products to change the operating environment for all users, each user would have to download a patch, a configuration file, or additional software. In many cases, there is little (if any) security performed when the software is downloaded to the client. Thus, a hacker could setup a website that poses as the legitimate service provider and trick clients into installing malicious updates. Another issue is that not all clients will possess network access at all times, so gaining access to this updated operating environment may prove difficult. A third issue is that these updates and configuration files could take hours to download or take up too much space on the devices to be updated successfully. Lastly, an update downloaded through an untrusted media (such as the Internet) could be intercepted and tampered with.

An embodiment deploying feature K could provide uniform views for all clients without the need to download extensive updates. Additionally, updating certain embodiments (such as the PCI device 40 shown in FIG. 6b) can be achieved by supplying the client with a new media for their upgradable memory interface 69. This form of update can be done in person, through the mail, or by visiting a distribution facility. Moreover, the information stored within the media could be protected via encryption and other security measures such that tampering in transit (or while at rest) could be detected by the device.

An embodiment can implement feature L (operation in closed systems). An example closed system is a supervisory control and data acquisition (SCADA) system. An example SCADA system is that of a power distribution and control system. Traditionally, these systems and ones like them have been secured by limiting access to their control networks. However, with ubiquitous access to the Internet, many of these traditionally closed systems have migrated to allowing access to their control networks via Internet communication paths. This can expose these critical systems to hackers or other malicious users. Normally, only authenticated access is granted; however, since the connection ports are publicly known and accessible from the Internet, it is possible for unauthorized users to attempt to access these control networks. Many traditional products could not be used to provide such access because of their lack of security and authentication capabilities. An embodiment deploying feature L could allow access to these closed systems without jeopardizing the trust and security required by these infrastructures. This would include accessing these closed systems by transiting the Internet. This can help protect these closed systems from access by terrorists, hackers, and other malicious users. One method feature L could deploy is the use of dual, tri, etc. client authentication. Instead of allowing any single authorized user to access the closed system, multiple authorized users must authorize an operation for a connection to be established. For instance, a computer with 2 USB ports could require two different embodiments (one belonging to each of two different people) in order to allow access to an operating environment, a network, etc. These two individuals could have different roles and thus provide for separation of duties. One could be a support technician and one could be a project supervisor. By requiring dual controls, one malicious insider could not utilize a single embodiment causing damage corporate resources alone.

While specific features are described herein, the present invention is not limited to use of all or a set number of the features. Instead, any of the features described herein may be selectively combined to address a certain use and/or need of a client and/or a provider.

A system 10a for providing a secure operating environment is illustrated in FIG. 1a. Various embodiments are illustrated including in FIG. 1a (logical view), FIG. 5a (network view), and FIG. 6a (USB device embodiment). As shown in FIG. 1a, the system 10 includes a computer 50, multiple authentication factors 32, 34, 36, 38 and 60, and a provider server 51 which is communicably connected with the computer 50 via the Internet. While the Internet is used as an example in FIG. 1a, the present invention is not limited to use of particular type of network. For example, communication may be implemented using packet switched facilities, such as the Internet, circuit switched facilities, such as the public switched telephone network, radio based facilities, such as a wireless network, etc.

According to an embodiment illustrated in FIG. 1a, multiple authentication factors of the system 10a include a first factor authentication 60, a second factor authentication 34, a third factor authentication 38, a fourth factor authentication 36 and a fifth factor authentication 32. Various factors may serve to implement the authentication of the system 10 in FIG. 1a including but not limited to a USB device as the first factor authentication 60, a valid PIN as the second factor authentication 34, a valid fingerprint used as the biometric information as the third factor authentication 38, a valid location information as the fourth factor authentication 36 and date/time information as the fifth factor authentication 32.

As shown in FIG. 1a, authentication with respect to the computer 50 and the server 51 may be implemented using any of the multiple authentication factors. The computer 50 and the provider server 51 may be a typical desktop or laptop computer, a handheld device such as a personal digital assistant (PDA), mobile phone, landline phone with a specialized query terminal, or any other source that allows a user to exchange information via a network such as the Internet or similar. Further, the system 10a may be provided with storage functionality that is not limited to any particular configuration or recording media and may include any type of temporary or permanent storage technology that is useable to retain data.

According to an embodiment, the computer 50 may be configured to enable various types of support including in conjunction with the server 51. For example, the computer 50 may be a financial management support system communicatively coupled with the server 51 which may be a financial/commerce service provider.

Figure 1B:
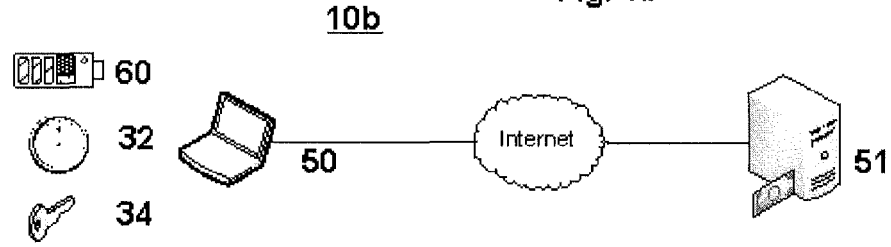
Figure 1C:
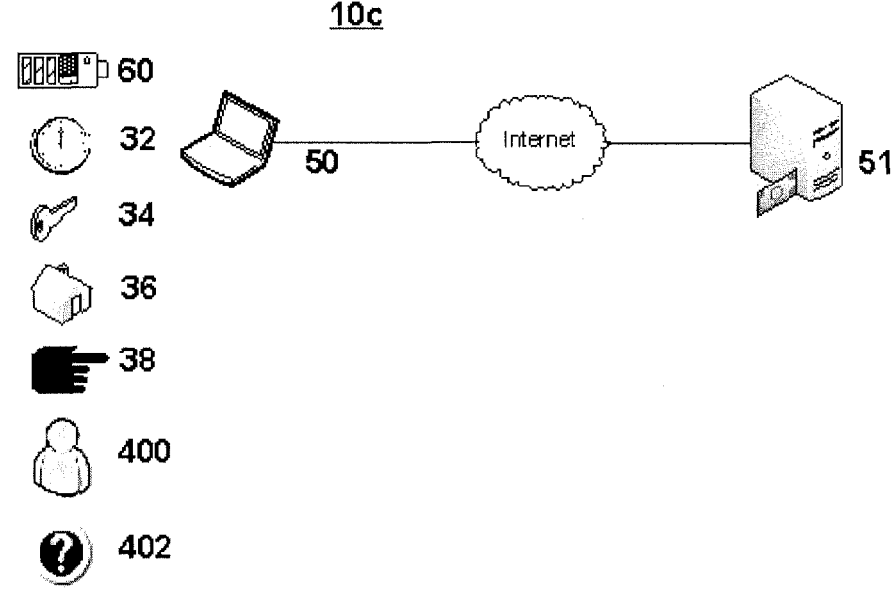

FIG. 1b shows a system 10b for providing a secure operating environment. As shown in FIG. 1b, the system 10b includes a computer 50, multiple authentication factors 60, 32 and 34 where a provider server 51 is communicably connected with the computer 50 via a network connection, which may include the Internet. FIG. 1c shows a system 10c including a computer 50 and multiple authentication factors 32, 34, 36, 38, 400 and 402. As shown in FIG. 10c, the multiple authentication factors of the system 10c include a first factor authentication 60, a second factor authentication 34, a third factor authentication 38, a fourth factor authentication 36, a fifth factor authentication 32, a sixth factor authentication 400 and a seventh factor authentication 402. The sixth factor authenticator 400 can be satisfied by identifying the role by which the client is authenticating, for example "Repair Technician." The seventh factor authenticator 402 can be satisfied by selecting a valid reason for accessing the system, for example "Emergency repair operations." Based upon all of these factors a specific set of features and data accesses may be granted to the authenticated user.

FIGS. 5a, 5b and 5c illustrate embodiments operating in a remote-client mode. A system 14a of providing a secure operating environment is illustrated in FIG. 5a. In FIG. 5a, a client 50 is connected with a server 51. For example, the server 51 may be of a financial/commerce service provider, or any other provider of information and/or services. As mentioned above, the client 50 (or computer) may be a financial management support system. The client-to-server connection could be through a local area network (LAN) or a wide area network (WAN) such as the Internet. However, as mentioned above, the present invention is not limited to any particular type of network and communication between any of the components can include packet switched facilities, such as the Internet, circuit switched facilities, such as the public switched telephone network, radio based facilities, such as a wireless network, etc.

In an embodiment shown in FIG. 1a and FIG. 5a the network connection can be established through the Internet. Client 50 can be any sort of computing hardware such as a personal computer (PC), a workstation, server, hand-held, cell phone, personal digital assistant (PDA), etc. Server 51 can be any sort of computing hardware such as a server, a cluster, a "cloud," etc. A "cloud" computing environment is generally viewed as a distributed and virtualized operating environment that takes advantage of the Internet or similarly large network infrastructures whereby each node operates as part of a collective whole doing small pieces of highly complex or resource-intensive tasks. Client 50 is configured to have a communication path to the USB device 60 (such as an available USB port). Device 60 has a USB interface as one way of communicating to the client 50. Shown in FIG. 1a client 50 utilizes feature F (enhanced multi-factor user authentication), which is enforced through device 60. Device 60 is considered "something you have" and thus provides for $1^{st}$ factor user authentication. The other four factors of authentication shown are something you know 34 such as a PIN, password, etc., something you are 38 such as biometric information, somewhere you are 36 such as current location, status information, etc., and when you are 32. As described in the embodiment(s) set forth below no limitation is intended by exemplary description of factors associated with authentication of a user, information and/or service.

Device 60, in an embodiment, contains several onboard hardware components as shown in FIG. 6a including: random access memory (RAM) 62, a programmable read-only memory (PROM) 64, a read-only memory (ROM) 66, and a Wireless network interface card (NIC) 68. The device 60 shown in FIG. 6a may be a USB device including onboard RAM 62, onboard PROM 64, onboard ROM 66, and a Wireless NIC 68. Each of the previously mentioned onboard hardware components 62, 64, 66, and 68 can be independently manufactured through standard means or through feature E (trusted fabrication). Assembly of these onboard hardware components 62, 64, 66, and 68 onto device 60 can be done through standard means or via trusted fabrication.

In an embodiment, the device 60 shown in FIG. 6a, has a hard plastic exterior capable of resisting normal wear and tear as well as occasional strain from dropping from reasonable heights or incidental contact with heavy objects (such as laptops, etc.); however, other exterior materials are possible such as metal, glass, rubber, etc. and these other materials can allow device 60 to resist higher levels of strain. Additionally, different exterior materials allows for different colors, shapes, textures, designs, etc. FIG. 6a shows device 60 as having a fixed external-facing USB interface; however, it is anticipated that device 60 can have a retractable USB interface that is not permanently protruding from device 60's main body. It is expected that device 60's external-facing USB interface (both fixed and retractable versions) can be made of a hard plastic material, a metal material, or other materials as available in the future. Onboard hardware component 62 contains RAM and should be manufactured using the materials and fabrication process necessary to stay competitive in the marketplace. As such, no specific requirement of the type, size, speed, or reliability of RAM 62 is specified here. Onboard hardware component 64 contains PROM and should be manufactured similar to RAM 62, using the available PROM resources to stay competitive. Onboard hardware component 66 contains ROM and should be manufactured similar to RAM 62, using the available ROM resources to stay competitive. Onboard hardware component 68 contains a Wireless Network Interface Card and should be manufactured to take advantage of current, new, and emerging wireless protocols as they are developed. Moreover, support for internationalized protocols is anticipated and expected. At the time of this writing, some sample wireless standards include 802.11g, 802.11n, 802.11j (for operation in Japan), Wi-MAX, etc.

It is expected when device 60 is manufactured within a trusted fabrication environment that anti-tamper and other hardware-based security mechanisms will be implemented to provide higher assurance that the device has not been compromised. Some examples of anti-tamper include, but are not limited to, casing or packaging which requires specialized tools to open, casing or packaging which cannot be resealed, tamper-evident tape or seals, pressure-sensing hardware, small hardware component fabrication, etc. Additionally, when device 60 is manufactured within a trusted fabrication environment, the method of manufacturing device 60's sub-components (RAM 62, ROM 66, etc.) can include fabrication utilizing trusted processes to ensure a higher assurance of trust and security.

The USB interface is a published standard and thus the hardware description of how device 60's exterior-facing interface connects to client 50's USB port is not described here. Device 60 contains an onboard processor (not shown) that handles USB signaling and operation of code contained within device 60. Device 60 may also contain a fingerprint scanner (not shown) and the necessary processor controls to interface with that component. This fingerprint scanner can be swipe-based, press-and-hold based, photo-based, or other future method of attaining a fingerprint. The fingerprint scanner can mitigate the effects of forged, replicated, or otherwise unauthentic fingerprints by implementing varying levels of liveness checks. Liveness checks are used to verify living organisms and tissues are used during authentication. This reduces the chance that severed thumbs will successfully authenticate during a fingerprint scan. Several USB devices exist in the market that contain fingerprint capturing capabilities and device 60 is anticipated to support integration of this capability when appropriate.

Device 40 in an embodiment, contains several onboard hardware components as shown in FIG. 6b including: random access memory (RAM) 62, a programmable read-only memory (PROM) 64, a read-only memory (ROM) 66, a wireless network interface card (NIC) 68, and an upgradable memory interface 69. Device 40 is manufactured to meet the specification for the PCI standard. Each of the previously mentioned onboard hardware components 62, 64, 66, and 68 can be independently manufactured through standard means or through feature E (trusted fabrication). Assembly of these onboard hardware components 62, 64, 66, 68, and 69 onto device 40 can be done through standard means or via trusted fabrication. Each of 62, 64, 66, and 68 are manufactured as appropriate for the end embodiment and it is understood that certain components 62, 64, 66, and/or 68 that are manufactured for a PCI device 40 would be incompatible with a USB device 60 and vice versa.

Figure 8:
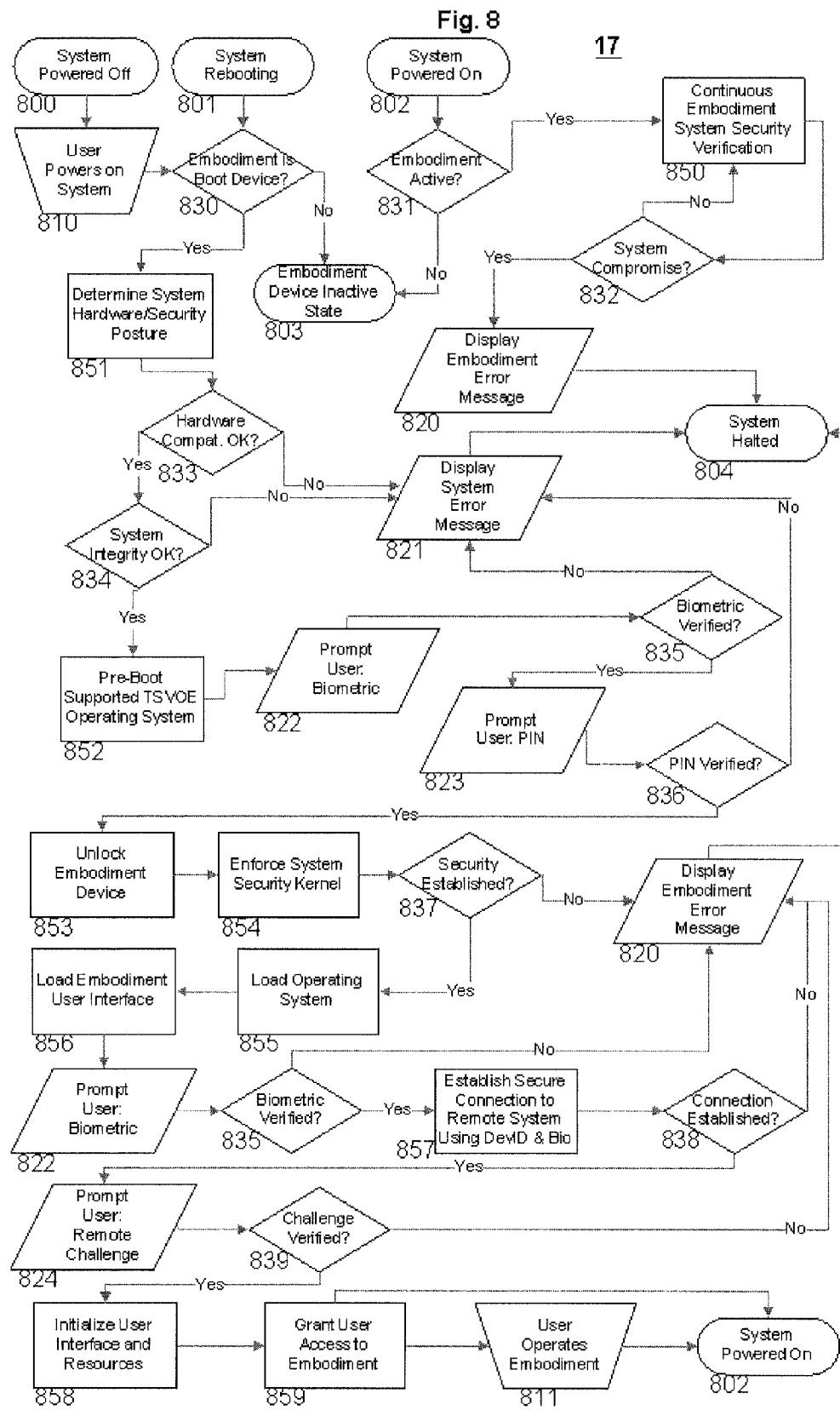
FIG. 8 is a flow diagram demonstrating an operating life cycle.

An exemplary process 17 for implementing an enhanced multi-factor authentication is illustrated in FIG. 8. As shown in FIG. 8, process 17 begins when a client begins a process by powering down their computer 50 (FIG. 1a) entering the system powered off state 800 (device active on a powered off system).

Subsequent to the system being powered off, process 17 continues when a user powers 810 on the system (device active on a rebooting system). For example, a client attaches the USB device 60 (FIG. 1a) to computer 50 providing $1^{st}$ factor authentication (something you have). The client turns on the power 810 to computer 50. Alternately, the client can enter computer 50 into the system rebooting state 801. After the system is powered on 810 or rebooted 801, computer 50 detects device 60 and performs a boot device check 830 (checking whether the device is the selected boot drive). If device 60 is the boot device, the system either manually or automatically attempts to boot from device 60. If device 60 is not the boot device, device 60 transitions to inactive state 803. Similarly, if computer 50 is in the powered on state 802 when device 60 is attached and device 60 is not active as determined by the embodiment active check 831, device 60 transitions to inactive state 803. Otherwise, device 60 determines computer 50's system hardware and security posture 851. If computer 50 passes a hardware compatibility check 833, device 60 will perform a system integrity check 834. If either check 833 or check 834 fails, device 60 will display a system error message 821 and halt computer 50 by issuing halt signaling to computer 50's processor whereby the system is halted in state 804.

If checks 833 and 834 succeed, device 60 then pre-boots a supported operating system 852 that is capable of prompting the client for biometric authentication 822 providing $3^{rd}$ factor authentication (something you are). Device 60 determines whether the client provided valid biometric information by performing a biometric check 835. Device 60 will allow the client, upon failure, to retry the biometric scan 822 a predefined number of times based upon the service provider's policy (not described here). If device 60 determines the client failed check 835, device 60 will display a system error message 821 and halt computer 50 by issuing halt signaling to computer 50's processor whereby the system is halted in state 804. If device 60 determines the client passed check 835, device 60 will prompt the client for a PIN 823 (or similar password-like information) providing $2^{nd}$ factor authentication (something you know). Device 60 determines whether the client provided valid PIN information by performing a PIN check 836. Device 60 will allow the client, upon failure, to retry the PIN check 836 a predefined number of times based upon the service provider's policy (not described here). If device 60 determines the client failed check 836, device 60 will display a system error message 821 and halt computer 50 by issuing halt signaling to computer 50's processor whereby the system is halted in state 804.

If checks 835 and 836 succeed, device 60 then unlocks protected device 60 components 853 including hardware, software, and firmware. Components 853 include RAM 62, PROM 64, ROM 66, and wireless NIC 68, as shown in FIG. 6a. Device 60 then enforces a system security kernel 854. Device 60 then performs a security establishment check 837. If device 60 determines that system security kernel check 837 failed, device 60 will display an embodiment error message 820 and halt computer 50 by issuing halt signaling to computer 50's processor whereby the system is halted in state 804.

Otherwise, device 60 then loads an operating system 855 and loads a service provider defined TSVOE user interface 856. Device 60 then prompts the client for biometric authentication 822. Device 60 determines whether the client provided valid biometric information by performing a biometric check 835. Device 60 will allow the client, upon failure, to retry the biometric scan 822 a predefined number of times based upon the service provider's policy (not described here). If device 60 determines the client failed check 835, device 60 will display an embodiment error message 820 and halt computer 50 by issuing halt signaling to computer 50's processor whereby the system is halted in state 804.

Otherwise, device 60 then establishes a secure connection to a remote service provider's infrastructure 857 using device 60's unique ID and the client's information. Device 60 performs a connection establishment check 838 to verify that the client meets the $4^{th}$ and $5^{th}$ factor authentication requirements. If device 60 determines that a connection could not be established to the service provider's server 51, device 60 will display an embodiment error message 820 and halt computer 50 by issuing halt signaling to computer 50's processor whereby the system is halted in state 804.

If the secure connection 838 is established device 60 then prompts the client with a remote challenge 824 that is sent by the service provider to validate the client. Device 60 then performs a challenge check 839. If device 60 determines that challenge check 839 failed, device 60 will display an embodiment error message 820 and halt computer 50 by issuing halt signaling to computer 50's processor whereby the system is halted in state 804.

If challenge check 839 succeeds, device 60 then initializes a user interface for the client and any additional resources that are granted to the client 858. Subsequent to initializing 858 of the user interface and resources, process 17 proceeds to enabling the device 60 to grant the client access to the operating environment 859 (grant user access to user interface of an embodiment). If the embodiment is an operating environment utilized by a human then process 17 continues by allowing a user to operate within an embodiment at operation 811. Otherwise, if the embodiment is an operating environment utilized by a server or infrastructure device process 17 continues by having device 60 enter the system powered on state 802. At operation 811, a user is able to perform allowed operation(s). At this point, device 60 is in a system powered on state 802. The client is allowed to operate within the operating environment as a client with financial management support 50 as shown in FIG. 5a.

While computer 50 is in powered on state 802 and embodiment active check 831 is true, device 60 will continuously monitor the embodiment to ensure system security verification 850. This involves performing a system compromise check 832. At operation 832, according to an embodiment, the process 17 determines whether a system environment is compromised. If check 832 determines no compromise has occurred, it will start a countdown until the next system security verification 850. If check 832 determines a compromise has occurred, it will display an embodiment error message 820 and halt computer 50 by issuing halt signaling to computer 50's processor whereby the system is halted in state 804. If computer 50 is in powered on state 802 and embodiment active check 831 is false, device 60 transitions to inactive state 803.

Additional embodiments are shown in FIGS. 5b, 5c and 5d. In FIG. 5b, a client 52 is configured, for example, to operate with file transfer protocol (FTP) support. The client 52 is shown utilizing a desktop computer. In FIG. 5c, a client 54 is configured to operate with streaming media support. The client 54 is shown utilizing a handheld device.

FIG. 5d shows an embodiment operating in a local-client mode. As shown in FIG. 5d, a client 56 is configured to operate in a local mode with local applications including a local document software 57, a local spreadsheet software 58, and a local web browsing software 59. The client 56 is shown utilizing a workstation. While specific examples of software are described with respect to the system 14d, the present invention is not limited to clients running any particular software. For example, the system 14d may implement any of customized software (proprietary or otherwise), service, etc.

The systems 14b, 14c and 14d using clients 52, 54, and 56 are shown to demonstrate the robust capability to adapt to all computing environments including server, mainframe, mobile, hand-held, and future computing environments. These embodiments should not be considered a required or limiting factor. For instance, the client 52 was defined as utilizing a desktop computer and having FTP support; however, clients 50 and 54, as well as other embodiments not shown, may contain FTP support. Similarly, the client 54 is shown as a streaming media client; however, the client 54 could contain additional services such as a FTP support and local web browsing software 59.

In FIG. 5b, the service provider infrastructure may contain a server 53 which may for example be an FTP server 53. While a server 53 of the system 14b is described as being an FTP server, the present invention is not limited to any particular type of server. For example, the server 53 may be any server that provides a service and/or information such as a file storage service provider.

In FIG. 5c, the service provider infrastructure may contain a streaming media server 55 usable by a streaming media service provider. These figures show separate servers for these services as well as separate client embodiments that utilize those services. It is anticipated that various service providers will provide multiple services within a single infrastructure and that multiple client types will be able to utilize a variety of these services without requiring multiple client embodiments. A service provider has the flexibility to determine the available services offered to their clients and to customize embodiments to their individual infrastructures.

Apparatuses 13a and 13b are PCI devices containing hardware components. The apparatus 13a and 13b are shown in FIGS. 4a and 4b. In FIG. 4a (external-facing view), a PCI device 40 is shown. The PCI device 40 contains a USB port for a keyboard 42 and a USB port for a mouse 44. The PCI 40 also contains a wireless network interface card light 46. While a USB port is described with respect to the apparatus 13a in FIG. 4a, the present invention is not limited to any particular type of port. For example, any other type of ports may be used to enable connection or interface with a physical connection device.

As shown in FIG. 4b (external-facing view), the apparatus 13b includes a PCI device 41 as shown. The PCI device 41 contains a wireless network interface card light 46, a Bluetooth™ Receiver 48 (capable of both transmitting and receiving Bluetooth™ signals), and a 15-pin VGA output port 49.

The PCI device 40 (FIG. 4a) conforms to the PCI standard and is able to be inserted into any standard PCI interface. According to an embodiment, the PCI device 40 contains two standard USB ports. While the port 42 has been designated as a keyboard port, because of the USB standard, a mouse could connect to this port and work effectively within this embodiment. This is because the PCI device 40 has support for both a USB keyboard and a USB mouse. Similarly, the port 44, which has been designated as a USB mouse port, could have a USB keyboard inserted and would work effectively within this embodiment.

As shown in FIG. 4a, the PCI device 40 provides ports 42 and 44 to reduce the effects of highly sophisticated viruses, Trojans, and other malicious software that can exist as low as the system's BIOS. This configuration of PCI device 40 is an exemplary implementation of feature B (redundancy of critical hardware). According to an embodiment, by implementing, and enforcing the use of, redundant ports 42 and 44, keystroke and mouse logging activities are nullified. This means that a client's PIN or passwords, credit card #'s, etc. cannot be easily captured by illegitimate or unauthorized $3^{rd}$ parties. As seen in an embodiment illustrated in FIG. 8, this is enforced via the system integrity check 834, the system security kernel 854, and the system compromise check 832. These verify validity of key hardware components, enforce a protection mechanism to minimize cross contamination between (potentially) infected hardware devices, and ensure ongoing system security during the embodiment's use. Even if some hardware components within a client's computer system are compromised, this would not invalidate the embodiment in question. Only when an embodiment determines that a critical hardware dependency has been compromised would the embodiment take action to reach state 804, which is a system halt.

FIG. 4a shows that the PCI device 40 provides a wireless network interface card (NIC). Network activity transiting this wireless NIC can be identified by the illumination of the wireless network card light 46. By providing a redundant network access method, the PCI device 40 has the potential to connect to a service provider's infrastructure via a secure channel 857 (FIG. 8). Secure channel 857 can be used if hardware components within the client's computer system are infected with malicious software. By using the wireless NIC to establish secure channel 857, the PCI device 40 cannot have communications intercepted, copied, modified, or otherwise tampered by non-network components within the client's computer system. It would be possible, however, for any device capable of capturing wireless network traffic to eavesdrop on the data sent from the PCI device 40's wireless NIC. However, since secure channel 857 can implement strong encryption capabilities, the copied traffic would be useless without the associated encryption key(s) or great expense in both time and money to break the encryption mechanism(s) deployed within PCI device 40.

The PCI device 41 (FIG. 4b) conforms to the PCI standard and is able to be inserted into any standard PCI interface. The apparatus 13b includes PCI device 41 that contains a wireless network interface card light 46, a Bluetooth™ receiver 48, and a 15-pin VGA output port 49.

The wireless NIC contained within the PCI device 41 provides similar services as described within this segment above for the PCI device 40. The PCI device 41 contains a Bluetooth™ transmitter/receiver 48, which can be used to communicate with wireless keyboards and mice (as well as other Bluetooth™ devices). The devices that the PCI device 41 can communicate with will be determined by the service provider and could be hardcoded within the PCI device 41's operating system. The PCI device 41 also contains a redundant video output port 49. By implementing this hardware redundancy, the PCI device 41 can prevent rogue hardware devices within the client's computer system from capturing screen data (which may be displaying personal data such as social security #'s, bank account #'s, proprietary and/or corporate secret data, etc.).

Demonstrations of how embodiments can deal with invalid operation attempts are shown in FIGS. 3a, 3b and 3c. In FIG. 3a, an embodiment of a system 12a shows an untrusted client 31 that attempts to circumvent USB device 60's integrity by using an invalid biometric 39. In FIG. 3b, an embodiment of a system 12b shows an untrusted client 31 that attempts to circumvent USB device 60's integrity by using an invalid PIN 35. In FIG. 3c, an embodiment of a system 12c shows an untrusted client 31 that attempts to circumvent USB device 60's integrity by accessing the system from an invalid location 37. While specific factor(s) are described as being invalid, the present invention is not limited to addressing these factor(s).

An untrusted client 31 can be a legitimate client or a thief, organized crime element, hacker, etc. In FIG. 3a, the untrusted client 31 does not possess the valid biometric information associated with a USB device 60 (first factor authentication). This can be because the untrusted client 31 is not the owner of the USB device 60 or the untrusted client 31 provided the wrong finger during a fingerprint scan (assuming biometric scan 38 were a fingerprint authenticator). In an embodiment described in FIG. 3a, it is assumed that the other four factors to authenticate a trusted client were valid. These include a valid date/time 32, a valid PIN 34, a valid location 36, and a valid USB device 60. However, since the biometric authenticator failed, the system 12a produces a failure result, and the device does not boot up and give control to the untrusted client 31.

In FIG. 3b, the untrusted client 31 does not possess the valid PIN for USB device 60. This can be because untrusted client 31 is not the owner of USB device 60 or untrusted client 31 provided the wrong PIN during a PIN check. In FIG. 3b, according to an embodiment, it is assumed that the other four factors to authenticate a trusted client were valid. These include a valid date/time 32, a valid location 36, a valid biometric 38, and a valid USB device USB device 60. However, since the PIN check failed, the system produces a failure result, and the device does not boot up and give control to the untrusted client 31.

In FIG. 3c, the untrusted client 31 does not boot the USB device 60 from a valid location. This can be because the untrusted client 31 has gone on vacation without pre-authorizing the travel location, because the untrusted client 31 moved to a new residence, etc. In FIG. 3c, according to an embodiment, it is assumed that the other four factors to authenticate a trusted client were valid. These include a valid date/time 32, a valid PIN 34, a valid biometric 38, and a valid USB device USB device 60. However, since the location authenticator failed, the system produces a failure result, and the device does not boot up and give control to the untrusted client 31.

According to an embodiment shown in FIGS. 3a, 3b and 3c, the multiple factors of authentication such as the PIN 34 and 35, USB device 60, biometric information 38 and 39, location 36 and 37, and date/time 32 may also be referred as first, second, third, fourth and fifth factors of authentication. As shown in FIGS. 3a, 3b and 3c, a server 30 is protected from unauthorized access using the multiple factors authentication.

Figure 2:
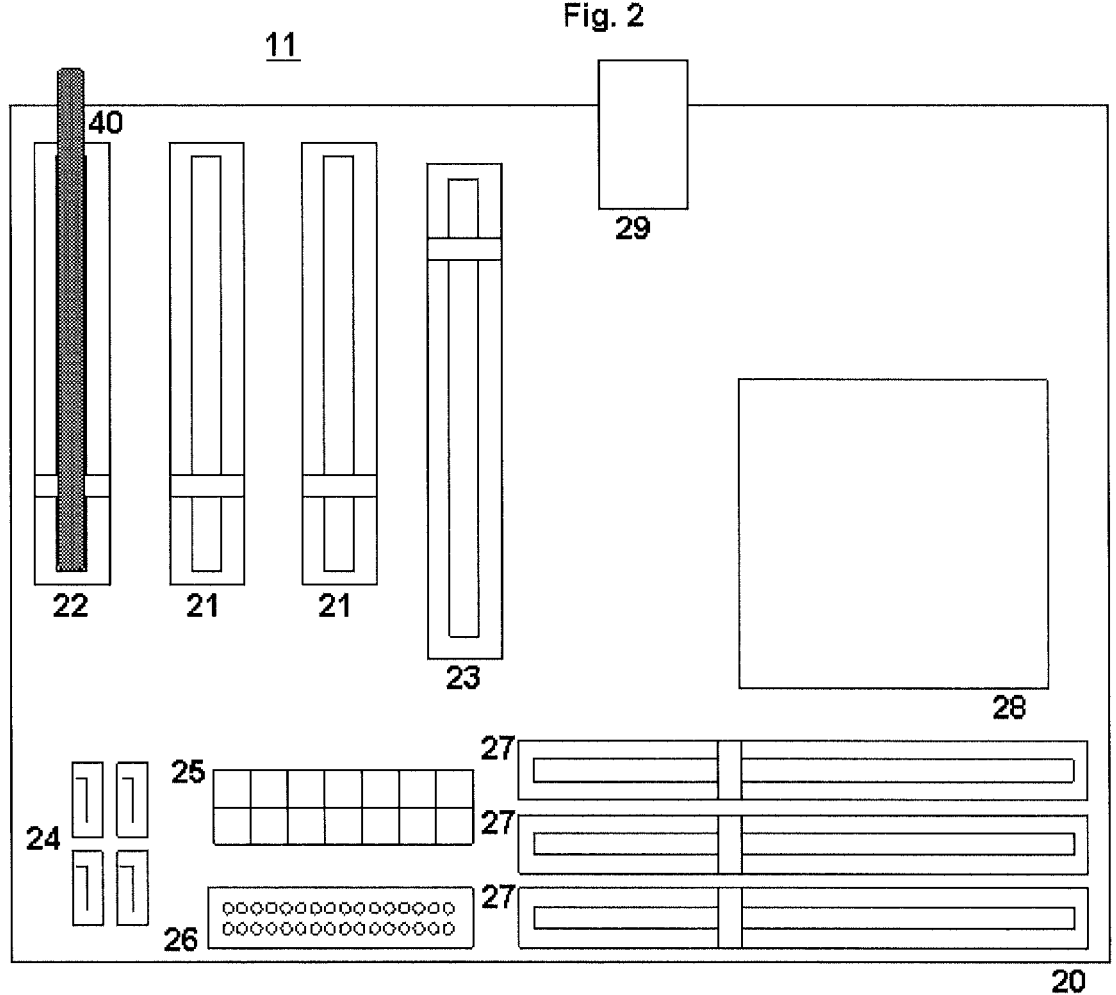
FIG. 2 illustrates a top view of a sample motherboard with a PCI device installed in a PCI slot.

A PCI device 40 of an embodiment as shown in FIG. 4a inserted into an unused PCI slot 21 as shown in FIG. 2.

An apparatus 11 configured with a sample motherboard with a PCI device installed in a PCI slot is shown in FIG. 2, the detailed descriptions thereof is set forth below. As shown in FIG. 2, the apparatus 11 includes a motherboard 20 (FIG. 2) that contains an unused PCI slot 21 or that is configured with the potential to remove a device from a used PCI slot (not shown). This unused PCI slot 21 will then have a PCI device 40 (FIG. 4a) inserted into slot 21 causing the slot to be filled 22 (occupied). The motherboard 20 may contain other components standard in a modern computer including a PCI-X slot 23, serial ATA interfaces 24, a motherboard power receiver 25, an IDE interface 26, RAM slots 27, a processor 28, and external facing USB ports 29. The components described, the number of components, the location of components, etc. constitute a generic motherboard layout and should not be interpreted as a required (or desired) hardware system for optimum operation of PCI device 40.

After the PCI device 40 is properly connected with the motherboard 20 (FIG. 2), the system is in system powered off state 800. The system can be powered on by the user 810 and similar operation as described above can be followed substituting PCI Device 40 in place of the USB device 60, as appropriate.

An embodiment produced via trusted fabrication undergoes special manufacturing and handling procedures. A USB device 60 shown in FIG. 7 was produced through such a process 16; however, other USB device embodiments similar in structure to the USB device 60 do not necessarily have all (or any) components produced through the trusted fabrication process. All functional and operational components produced for use in the USB device 60 passed all security and verification checks. FIG. 7 shows the hardware manufacturing process to produce sample components comprised within the USB device 60.

An exemplary process 16 for verifying hardware, firmware, and software is illustrated in FIG. 7. The process 16 includes a trusted fabrication process used to produce an example USB device 60 shown in FIG. 7. Trusted fabrication begins at the start process state 700 where manufacturing orders are given to: produce the RAM 751, produce the PROM 752, produce the wireless NIC 753, and produce the ROM 754. As shown, these production processes can be done in parallel. However, a single manufacturer could produce one or more of these individual components and the production and manufacturing process could be in series or in parallel without impacting the trusted fabrication process. Any known technology of manufacturing may be used for producing the RAM 751, producing the PROM 752, producing the wireless NIC 753, and producing the ROM 754.

Subsequent to producing operations at 751, 751, 753, 754, the process 16 continues to determining whether production of parts is acceptable 730. A production acceptance check 730 is performed to verify that a sample of each of the components produced meets manufacturing specs. If a certain number (not strictly defined here) of the sample set fails check 730, that subcomponent (i.e., RAM, or ROM, etc.) will be scrapped and a security audit 755 will be performed to determine if there is a weakness in the trusted manufacturing process for that component. The process is then restarted, reentering the start process state 700. If check determining acceptability 730 succeeds, process 16 moves to securely delivering 750 these components to an assembly manufacturer. Once received by the assembly manufacturer, process 16 moves to an operation where the manufacturer performs a security check 731 on the components received. If check 731 fails, this indicates tampering or damage is evident, and the portion of the shipment affected will be scrapped and a security audit 755 will be performed and the process is restarted and enters the start process state 700. If check 731 succeeds, process 16 moves to an operation where the manufacturer produces the USB device 60 via trusted fabrication processes 756. After fabrication, process 16 moves to performing a trusted fabrication succeeded check 732. If check 732 fails, this indicates that the trusted fabrication assembly of the components into the USB device 60 was unsuccessful. When it is determined that the trusted fabrication is not a success at operation 732, the USB device 60 is scrapped and a security audit 755 will be performed. The process then restarts in the start process state 700. If check 732 succeeds, process 16 moves to writing and verification of firmware and software components 757. At this point, the USB device 60 is complete and the process 16 enters the embodiment hardware complete state 701.

Figure 9:
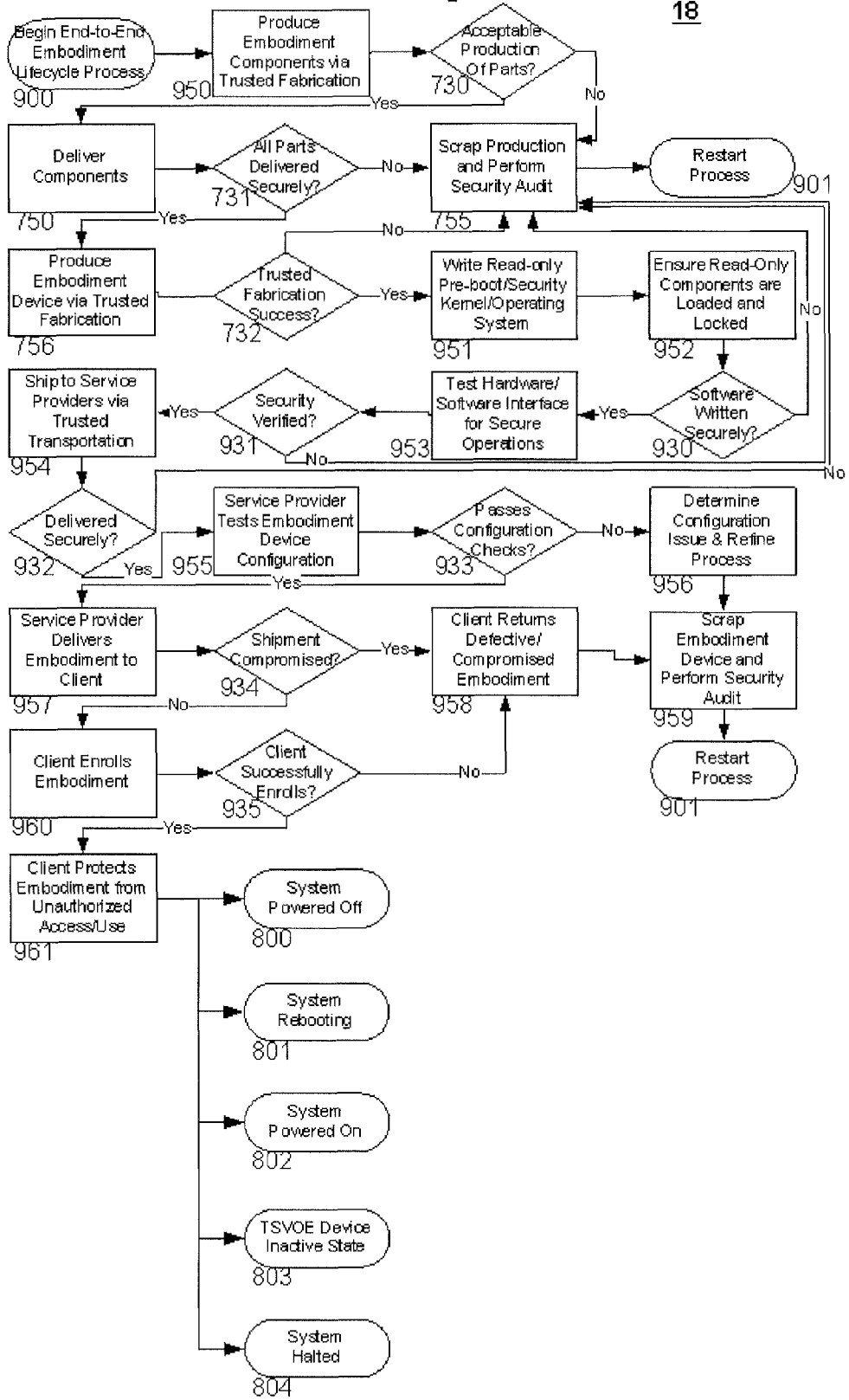
FIG. 9 is a flow diagram demonstrating a lifecycle from manufacturing/fabrication through use by the client.

FIG. 9 shows the end-to-end lifecycle of an embodiment. The figure demonstrates the manufacturing of an embodiment through trusted fabrication (shown in FIG. 7 and described previously), customization by a service provider, delivery to a client, and operation of the embodiment by the client.

An embodiment of a process 18 that has a useful lifecycle from manufacturing/fabrication through use by a client is shown in FIG. 9. The process 18 begins the end-to-end embodiment lifecycle in process state 900. At this state, a service provider has determined a business need for an embodiment and has established manufacturing requirements (including hardware, firmware, software, and feature components).

Subsequent to the beginning of the end-to-end embodiment lifecycle process state 900, process 18 moves to producing components via trusted fabrication 950. A production acceptance check 730 (FIG. 7) is performed to verify that a sample of each of the components produced meets manufacturing specifications. If a certain number (not strictly defined here) of the sample set fails check 730, that subcomponent will be scrapped and a security audit 755 will be performed to determine if there is a weakness in the trusted manufacturing process for that component. The process is then restarted, reentering the restart process state 901. If check 730 succeeds, process 18 continues by securely delivering 750 these components to an assembly manufacturer. Once received by the assembly manufacturer, the manufacturer performs a security check 731 on the components received. If check 731 fails, this indicates tampering or damage is evident, and the portion of the shipment affected will be scrapped and a security audit 755 will be performed and the process is restarted and enters the restart process state 901 (FIG. 9). If check 731 succeeds, process 18 continues whereby the manufacturer produces the embodiment via trusted fabrication processes 756. After fabrication, a trusted fabrication succeeded check 732 is performed. If check 732 fails, this indicates that the trusted fabrication assembly of the components into the embodiment was unsuccessful. The embodiment is scrapped and a security audit 755 will be performed. The process then restarts in the restart process state 901.

If check 732 succeeds, process 18 continues where the embodiment's pre-boot, security kernel, and operating system are written to the embodiment at operation 951 in a write-once-only manner. After writing a read-only copy of the pre-boot/security kernel/operating system at operation 951, process 18 continues to a hardware finalization process 952 that is used to enforce read-only properties on the desired components. A software security check 930 is performed to ensure that the intended software was indeed written to the embodiment. If check 930 fails, this indicates tampering or damage is evident and the embodiment will be scrapped and a security audit 755 will be performed and the process is restarted and enters the restart process state 901. If check 930 succeeds, an extensive test of the hardware and software interfaces for secure operations 953 is performed (testing of hardware, firmware, and/or software interface(s) for secure operations).

The process 18 proceeds to checking whether security is verified 931. A security verification check 931 is performed to validate the results. If check 931 fails, the embodiment is scrapped and a security audit 755 will be performed. The process then restarts in the restart process state 901. If check 931 succeeds, the embodiment is shipped to the service provider via trusted transportation 954. A secure-delivery check 932 is performed to ensure no tampering has occurred en route to the service provider. If check 932 fails, the embodiment is scrapped and a security audit 755 will be performed. The process then restarts in the restart process state 901. If check 932 succeeds, the service provider tests the embodiment's configuration 955 to ensure it meets their design specifications. A configuration pass check 933 is performed validating the results of the configuration test against the expected results. If check 933 fails, the results (as configured with the embodiment) do not match the service provider's expected results. A process to determine the configuration issue and refine the manufacturing phase 956 is performed. Then, the embodiment is scrapped and a security audit 959 is performed. The process is then restarted in the restart process state 901.

If check 933 succeeds, the embodiment is delivered to the client. The client receives the embodiment and checks for compromise 934. If check 934 indicates compromise, the process 18 proceeds to having the client return 958 the defective and/or compromised embodiment to the service provider. The embodiment is scrapped and a security audit 959 is performed. The process is then restarted in the restart process state 901. If check 934 succeeds, the process 18 proceeds to having the client enroll the embodiment 960 personalizing it with their unique PIN and biometric information. Additionally, depending on the service provider configuration, other enhanced multi-factor authenticators are established by the client. These may include where you are, when you are, etc. Alternately, the service provider could establish pre-existing rules for these or other enhanced multi-factor values. A client enrollment check 935 is performed to determine if the embodiment was successfully enrolled by the client. If check 935 fails, the client returns 958 the defective and/or compromised embodiment to the service provider. The embodiment is scrapped and a security audit 959 is performed. The process is then restarted in the restart process state 901. If check 935 succeeds, the client has an enrolled embodiment and protects it from unauthorized access and use 961. At this point the client can utilize the embodiment by connecting the embodiment to their system and rebooting their system 801. Another possibility is that the client can securely store the embodiment in a safe location for later use (not shown). Otherwise, the client can attach the embodiment to their running system and the embodiment would eventually enter the device inactive state 803 (until a power cycle occurs or the embodiment is detached).

Figure 10:
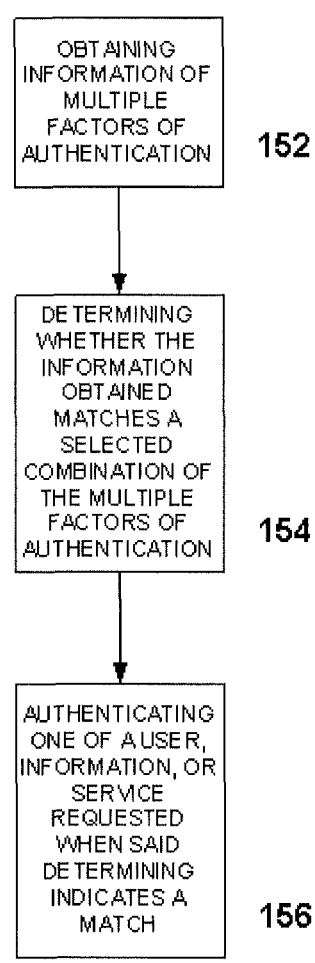
FIG. 10 illustrates a process for authenticating a user, information or service.

An exemplary process 150 for authenticating a user, information or service is illustrated in FIG. 10. As shown in FIG.

10, process 150 begins with obtaining 152 information of multiple factors of authentication. As previously discussed, an embodiment utilizing multiple authentication factors may include a first factor authentication 60, a second factor authentication 34, a third factor authentication 38, a fourth factor authentication 36, a fifth factor authentication 32, a sixth factor 400 (FIG. 1c), and/or a seventh factor 402 (FIG. 1c). At operation 152, information pertaining to any combination of the multiple factors of authentication is obtained.

Subsequent to obtaining 152 the information, process 150 continues by determining 154 whether the information obtained matches a selected combination of the multiple factors of authentication. Determination 154 may be made using various pieces of information supplied by a client and/or a service provider. For example, a provider of a first service may request that certain combinations of the enhanced multi-factor authentication feature be used while a second service provider requests another combination.

After determining 154, process 150 of FIG. 10 proceeds to authenticating 156 one of a user, information or service requested when said determining indicates a match. For example, a device 60 is initialized and a user interface and recourses are enabled to grant the client access to an operating environment.

Figure 11A:
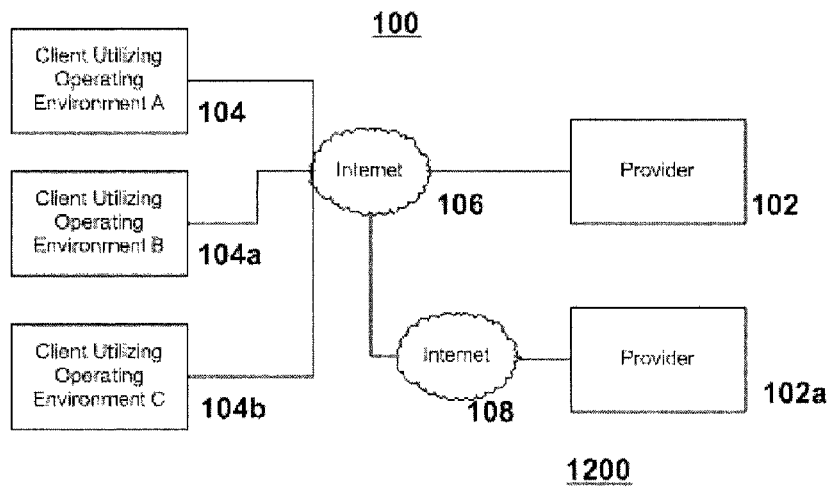
FIG. 11a illustrates a system for authenticating a user, information or service based on targeted multiple factor authentication combinations.

In FIG. 11a, a system 100 is provided for authenticating a user, information or service based on targeted multiple factor authentication combinations. As shown in FIG. 11a, the system includes clients 104/104a/104b, providers 102/102a, and networks 106/108. As depicted in FIG. 1, various types of operating environments may be configured to correspond to the clients 104/104a/104b to enable access to information and/or request(s) of the providers via networks 106 and/or 108. As mentioned above, the clients 104/104a/104b may be a typical desktop or laptop computer, a handheld device such as a personal digital assistant (PDA), mobile phone, a specialized query terminal, or any other source that allows a request for authentication to be made via the network(s) 106, 108.

Figure 11B:
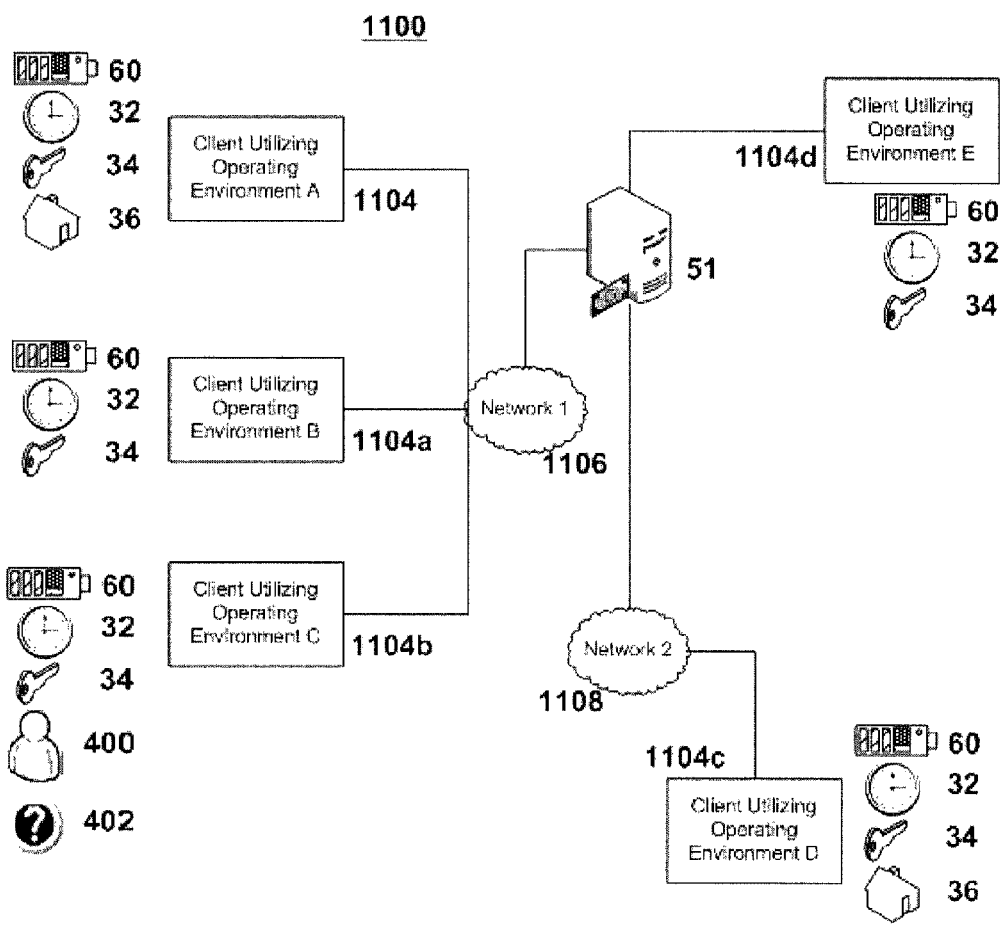
FIG. 11b illustrates a system for determining an environment relative to a processing of a request and processing the request in the environment.

An exemplary system 1100 for determining an environment relative to a processing of a request and processing the request in the environment is illustrated in FIG. 11b. The system 1110 enables processing of request(s) of multiple clients communicatively coupled with different networks based on various authentication combinations correspondingly provided to the clients. As depicted in FIG. 11b, the system 1100 includes clients utilizing operating environments A, B, C, D and E, a server 51 and network 1106 and network 1108. The clients may be selectively provided with operating environments A, B, C, D and E based on various combinations of authentication factors 32, 34, 36, 38, 60, 400 and 402. For example, a client may be provided with operating environment A that includes authentication factors 60, 32, 34 and 36 while another client may be provided with operating environment B based on authentication factors 60, 32 and 34. Determination of the authentication factors may be determined based on a variety of criteria such as level of use defined for other clients in an industry, company, etc., role assigned to the user, a type of service and/or information provided, etc. It is also possible to have different sets of authentication factors for which different types of information or service of a user.

Many other embodiments are possible utilizing any combination of the features described above. For instance, a PCI device 40 could implement features A, B, C, E, and F. While a USB device 60 could implement features A, E, F, and I. The simplest case would be a generic embodiment implementing a single feature, such as feature F. An example of when feature F would be useful as a single-feature embodiment would be to provide identity theft protection. Advanced government-use embodiments could implement all features A through L. Moreover, additional features not described above could be implemented in various embodiments. The determination of which of combination of feature(s) described above to use may be made based on various criteria. In at least one embodiment, a system is configured with features selected from among features A through L described above based on a sample usage environment within which the system will be used including but not limited to level of security needed, sensitivity of data/service to be protected, etc. However, the present invention is not limited to any combination of the features described herein in order to protect information, services and property from unauthorized use, theft, corruption, etc., while enabling the information, service and/or property to remain accessible and productive to intended users.

For example, there are many embodiments that can be tailored for a specific industry or service provider, including for government use. These can include direct government use (such as by military officers, government employees, contractors, foreign government liaisons, etc.) or indirect government use (such as by airplane passengers). Some sample embodiments of the former (direct government use) include flash passes, contactless smart cards, contact smart cards, swipe cards, and USB devices such as the USB device 60. Other form factors are possible and expected. These same form factors are possible for use in the latter (indirect government use) cases.

The US Government current deploys the Common Access Card (CAC) to DOD personnel. The CAC contains encryption keys used to encrypt email messages. It also contains identity and digital signature certificates. The CAC also serves as a photographic identification (it has a picture of the authorized user printed on the front). Lastly, the CAC contains biometric and PIN information. The CAC can serve as a 3-factor authenticator. It generally meets the requirements of something you have (the CAC), something you know (a PIN), and something you are (fingerprint or other biometric sample). The CAC, however, has several potential drawbacks. First, it does not natively support the other factors as described in feature F, which are somewhere you are, when you are, what role you are, and why you are. Second, the photo protection is only good if a human is positioned at every entry point to every installation that the ID is valid at. Moreover, the form factor for a CAC is known and forging a generic ID based on the CAC would not be too sophisticated and has been demonstrated many times over the past few years at various hacker conferences. Third, the CAC is authorized for use only on unclassified systems. These drawbacks necessitate a more advanced feature-friendly capability.

An embodiment can be implemented in smartcard form factor. This embodiment could implement, for example, features D, E, F, and J. It could implement contact or contactless communication methods. These capabilities are achievable within a reasonable size and weight. By implementing feature D, this embodiment resists attacks by entities attempting to spoof or duplicate a valid device and attacks aimed at disabling or piggybacking on legitimate users. By implementing feature E, this embodiment reduces the potential to have untrusted or unverified components added to the device. Additionally, this embodiment would not contain any value-added features or components—a quality that is difficult to ensure. By implementing feature F, this embodiment substantially increases the difficulty an unauthorized user would have to overcome in order to utilize a stolen device. Also, a lost device would be useless to a would-be attacker because they could not successfully authenticate an embodiment that implements all enhanced multi-factor components and bypass the security imposed by the other features. By implementing feature J, this embodiment prevents an untrusted hardware environment used by the client from interfering with the legitimate operation of the device. Additionally, any malicious software or hardware on the system would be unable to compromise the device. Since this sample embodiment is in a smartcard form factor it could easily contain a photographic image of the valid user, similar to that used by the CAC and the PIV (personal identification verification as stated in HSPD-12 and signed by President Bush).

The US Government, along with most other countries, is attempting to monitor air passengers to screen out security threats (such as bombers, hijackers, etc.). The security process is becoming ever more stringent and time consuming. Currently, most US domestic flights require a photo ID and a valid boarding ticket to enter the security line. This has several drawbacks. First, older people tend to take awhile to locate proper identification and are unfamiliar with the security process in general, slowing everyone down. Second, the number of non-standard photo identifications used by passengers is exorbitant. There are at least 50 different driver license types and countless state, federal and military IDs, etc. This makes the task of verifying a legitimate photo ID very difficult (if not impossible) even for the trained eye. Third, adversaries are not always going to use legitimate identification, so identification based on name alone will become less useful as time goes on. A method to standardize air passenger identification is desirable.

An embodiment can be implemented in several form factors. The smartcard form factor will be used here as an example. This embodiment could implement features A, D, E, F, and H. It could implement contact or contactless communication methods. The contactless communication method will be used here as an example. By implementing feature A, this embodiment expects that the client may be a malicious actor (e.g., a terrorist) that may attempt to alter the information on the device. This embodiment would have extra security precautions designed to prevent these attempts. By implementing feature D, this embodiment would operate primarily as a security device. Since the primary service for this embodiment is to provide identity verification for security personnel, trusted, secure, and verifiable operation will be the primary operation of the device. At anytime the device determines it is no longer in a trusted state it would self-destruct. Self-destruct as described here would be to terminate internal hardware and software such that the device would be unusable. This state would be identifiable by security personnel who would know to scrutinize the client in possession of this particular device. Other self-destruct options are possible and anticipated. By implementing feature E, security personnel can easily identify spoofed or fraudulent devices, as they would not contain valid keying or other security identifiers that exist in legitimate embodiments. By implementing feature F, an embodiment can speed the air passenger identification process. A client can wave their device near a proximity scanner whereby an overhead monitor displays a large photograph of the legitimate owner of the device. Security personnel can view the full-screen image and vet it against the person approaching them. This provides several benefits. First, if the person is a known or suspected terrorist or other individual that is a security risk, the security personnel have both a better chance and longer time to respond to the situation. Second, the person in question has not reached the security personnel yet, so risk to security personnel is minimized. Third, there is less chance of misidentification of a device holder because the visual identification is as large as a monitor screen versus that of driver's license photo, etc. Forth, suspicious biochemical or physical signals can be identified and recorded. This can include fidgeting, avoiding eye contact, masking facial or other physical features when proceeding through various security procedures, etc. Other benefits are possible as well. By implementing feature H, this embodiment can be customized for use during airport security screening, subway security, bus transportation, or other uses. The views available can differ based on the use environment. In the example of airport security, a reasonable (but not the only) use case is to have the embodiment operate in stand-alone mode and to display the device's stored client photo next to a live video feed of the client on a TV or console near the security personnel. Additionally, when the device is accessed by the proximity scanner, an automatic lookup of flight information can occur. Thus, the need to have a valid boarding pass out may not be necessary.

Many other government or other types of uses are possible. Those described herein should serve as the basis for protection of government-related embodiments but should not be considered an exhaustive list of the potential embodiments feasible for government or any other use.

For example, there are many embodiments that can be tailored use in the financial sector. These can include direct monetary use (such as credit/debit cards, monetary/credit transaction authorization, etc.) or client identification use (such as consumer identity protection, etc.). Some sample embodiments include contactless smart cards, contact smart cards, swipe cards, and USB device such as the USB device 60. Other form factors are possible and expected.

Many financial institutions provide credit cards or similar swipe cards to their clients. This system has had weaknesses from the beginning with the easy capture of credit card numbers, owner's name, and expiration date. One of the early solutions was to provide an authorization code on the back of the same card. This provided a trivial amount of security insomuch as it prevented a hacker from gathering the previously identified information out of a company's database. However, attackers became more sophisticated by implementing fraudulent card swipe machines, using cameras near ATM machines, etc. The solution to these new attacks was to call up a customer when certain suspicious activity occurs on the account. This is troublesome for the merchants, service providers, and customers. Another issue is that oftentimes a client does not maintain possession of their card 100% of the time. An example of this is when a client pays for a meal at a restaurant and supplies the waiter or waitress with their credit card. While out of the client's possession, any number of attacks can be used such as swiping through a capture device, copying of the information (including the authorization code on the back) by hand, use of a cell phone or other camera to photograph the card, etc. Additionally, dishonest clients often claim loss or theft of a card to avoid payment for goods legitimately attained. An easier and substantially more secure method for a client to access and authorize transactions from various credit accounts is through an embodiment tailored for this use case.

Such an embodiment could implement features A, C, D, E, F, and G. By implementing feature A, this embodiment treats the client as untrusted. This is useful in cases where the client may not always be in possession of their embodiment, such as the restaurant example described above. By implementing feature C, this embodiment provides separate or distinct views based upon the use environment. For example, if the client is purchasing groceries at a supermarket, this embodiment can provide the user with a list of available credit accounts to apply the purchase to. An alternate example would be if the client was paying for a meal at a restaurant. In this example, the embodiment could be activated for one-time-use thus defeating all of the attacks listed above. Note that in this case, the client still signs the receipt and if the one-time-use was applied towards a card-copying process, the waiter or waitress would not have a valid receipt for the client to sign. Moreover, even if the waiter or waitress used a copying mechanism, they would not be able to authorize a transaction with the information they captured. This is because the copied data contains an identity signature used to lookup transaction accounts versus signing for receipt of goods (or the meal). By implementing feature D, this embodiment protects any internal hardware, firmware, and software from attack. There are varying levels of protection. An example protection mechanism could be a wire-mesh beneath the surface of the embodiment that surrounds the critical components. Tampering of the device would become evident to the owner who would then be able to take defensive measures (such as reporting the incident and getting a new device). By implementing feature E, this embodiment ensures no backdoor hardware, firmware, or software was added to the product by any of the manufacturing entities. Additionally, the quality of the product should increase through a trusted fabrication process. By implementing feature F, this embodiment locks down the device such that authorized transactions can only be completed by the embodiment's owner. By implementing feature G, this embodiment could be delivered in various form factors including a smartcard or USB device 60. These and other potential form factors provide different use cases for the client. If the embodiment takes on a smartcard form factor, then the operational use is similar to a standard credit card or credit smartcard, and could contain wireless, swipe, or credit card number entry methods. If the embodiment takes on a USB device 60 form factor, then a new functional use would emerge where a fixed credit card number would not need to be permanently displayed on the surface of the device. Instead, only in the case where the wireless and/or USB interface components fail would a number need to be displayed. Thus, a lost, stolen, etc. device 60 would not automatically reveal any account information.

Many financial institutions provide method to automate the transfer of money between accounts. They also allow for automatic bill-pay and other monthly subscription payments. Many confidence schemes and online frauds are successful because the unwary consumer falls for a gimmick. A hacker with software running on a client's system is capable of automating money transfers that appear legitimate. Automatic payments can be posted to a client's account with or without their knowledge. An online scammer can transfer money from an account by obtaining the account number, routing number, name, etc. of the account holder. All of these attacks, plus others not listed, can be mitigated by implementing an embodiment with the purpose of identifying and authenticating a client before authorizing a transaction.

Such an embodiment could implement features B, C, E, and F. By implementing feature B, redundant implementation of critical hardware can be built into the embodiment. This could provide wireless network access, a keyboard input interface, etc. These greatly reduce the ability for an attacker to implement attacks that utilize compromised hardware within the client's computing system. By implementing feature C, the embodiment can present the client with different views for different transactions. Anomalous (pending) transactions can alert the user that potential unauthorized access of their account(s) has occurred. However, no such anomalous pending transactions actually results in the loss of the client's money, credit, etc. unless the client specifically authorizes the suspicious transaction. By implementing feature E, this embodiment protects the client by ensuring the device will deactivate itself if a security incident is detected. Additionally, a hacker or similar entity would not be able to authorize pending transactions automatically. By implementing feature F, this embodiment requires at least two of the enhanced multi-factors to authenticate a user before authorizing a transaction. Thus, a lost or stolen embodiment could not be easily used to access a client's information, create transactions, or authorize pending transactions.

Another use for an embodiment like this is to authorize transactions that are pending on a standard credit account. For instance, the previously identified embodiment could be used to authorize transactions only. Online purchases, etc. could be initiated through normal means. This can include the client purchasing items from home, from an Internet café, etc. The client would use the embodiment only to authenticate to the credit-provider and then authorize pending transactions. This would substantially increase the security of these types of activities and would eliminate the threat imposed by adversaries that copy, duplicate, etc. a credit card or other account type (such as checks associated with a checking account). Moreover, this allows the client to order, purchase, or reserve products and services through their normal computer system. This computing system could contain viruses, keyloggers, etc.; however, all of these transactions would be in pending status until the client activated their embodiment. Then, as described above, the client could authorize pending transactions from a trusted and secure environment. This means that a hacker, etc. could steal the client's information (e.g., credit card info) and create pending transactions but cannot authorize the transactions. Also, the client would know that their information has been stolen. This is significantly different than the current model. With available systems in the marketplace, a hacker can steal the client's information and successfully order products of services. The client would not know about this illegitimate activity unless the purchase happened to trigger an alarm (and the merchant contacted the client), the client monitors their accounts daily, or the client receives a statement with an unauthorized transaction on it. This new system prevents designated purchases from authorizing until the client approves of them through their embodiment. Examples of designated purchases could be any purchase over a fixed dollar amount, purchases from foreign service providers, automated wire transfers, etc. Additionally, the client may be able to activate a trace on an unauthorized transaction to alert the merchant and other entities of the fraudulent activity. This allows the address of delivery, contact info, etc. from the bogus transaction to be logged. Police can build a profile and merchants can create a database of known-bad entities that can automatically flag other transactions that are not protected by embodiments (thus the embodiment may provide external services to clients that do not have embodiments).

Yet another use for an embodiment like this is to provide non-repudiation for delivery of merchandise. The number of fraud cases where clients claim non-receipt of goods is increasing substantially. These are carried out by the client through means of requesting a charge-back for the item. To mitigate this client-based fraud, an embodiment could be used as the method to sign for delivery of products and goods. Since the device enforces enhanced multi-factor authentication of the client, the client cannot claim they did not receive the merchandise. Moreover, such a claim would immediately identify the client as perpetrating fraud and civil and/or legal action could be taken by the credit provider. A related use of this embodiment is to maintain a list of ownership and/or possession of products being delivered. Any time a parcel, package, etc. transfers control the receiving entity would use their embodiment to digitally sign the transfer. This ensures delivery personnel cannot steal items without being caught. Thus, end-to-end delivery of merchandise can be tracked and at no time does a package legitimately leave responsibility of a liable entity.

Generally, most financial institutions open their corporate infrastructure by providing Internet access to their clients. However, attackers can use these same accesses to launch attacks against the corporate infrastructure. There is currently no way to provide a high level of protection against such attacks. A weakness in any device in the series from the Internet to internal corporate resources within the corporate infrastructure provides a potential attack point for these attackers. A method to mitigate this significant threat source is to deploy a system and method to limit Internet access to only clients with valid systems. This provides numerous benefits. Among the benefits, first, the equipment capable of being attacked is reduced to the client's embodiment, the routers exposed to the Internet (which can be secured with a separate infrastructure embodiment), and the end-point server device to which the client communicates (which can also be secured with a separate service-provider embodiment). Second, managing network-perimeter defense resources is greatly simplified. Third, network activity from non-trusted hosts could be secured via VLANs and other technologies to deal with individuals that are currently not utilizing an approved embodiment. These can be people who want to register for services, create accounts, etc. Also, access to critical resources can be segmented from those open-Internet infrastructure components.

An embodiment that achieves these goals could implement features A, D, F, and I. By implementing feature A, the embodiment is cognizant that the service provider is wary of the client and is determined to enforce stronger security mechanisms to restrict the client (as much as possible) from being able to carry out malicious activity. By implementing feature D, the embodiment is locked-down such that the client cannot easily circumvent security countermeasures implemented within the embodiment. By implementing feature F, the client must provide several factors to activate an embodiment. Additionally, dynamic challenges can be sent from the corporate infrastructure to validate the client. By implementing feature I, the embodiment is specially tailored to reduce access to capabilities (applications, resources, etc.) that can be utilized to attempt to attack the corporate infrastructure. Without several key components, an embodiment would not be able to successfully attack the corporate infrastructure.

Many institutions are concerned with insider threat. To help mitigate this they implement various security countermeasures to reduce the likelihood that an insider can attack company resources. These can include two or three-factor user authentication devices, multi-user access to resources, separation of duties, etc. However, when these employees access resources from outside the corporate infrastructure (mobile user, access from home, etc.) the corporation cannot easily enforce dual-access controls. Additionally, two or three-factor authentication may be insufficient to offset the potential for abuse by employees. A mitigation strategy is to deploy an embodiment that is capable of restricting an employee's access to resource depending on their use environment. This provides several benefits. First, if the corporation suspects the employee of suspicious activity, an embodiment can have access to resources restricted. Additionally, the user can be kept unaware of any ongoing investigation and few (if any) warning signs could be available to the insider. Next, dual (or more) user authentication can be enforced for remote clients. To implement this feature, a remote user's access could be tethered to one-or-more other employees. These employees could be onsite or mobile, depending on the corporation's implementation. Third, separation of duties can be enforced such as requiring a manager or supervisor to authorize access by a remote application developer.

An embodiment that can achieve these goals could implement features C, D, F, and J. By implementing feature C, the embodiment can tailor the resources available to the client based on information gathered from feature F. If the client is operating from their corporate office, more resources and accesses may be granted. However, if the client is operating from an Internet café, they may have a much more restricted set of resources and accesses. By implementing feature D, this embodiment can enforce a strong security kernel that scrutinizes both the client and the hardware system that the embodiment is attached to. This is useful to minimize attacks against the system and to ensure that the embodiment is constantly trusted, secure, and verifiable. By implementing feature F, this embodiment can provide information that feeds feature C's determination of resources and the restricted view given to the client. Moreover, the multiple factors of authentication help guarantee only legitimate users are utilizing the embodiment. By implementing feature J, a client can be restricted from saving, printing, etc. corporate resources from unauthorized locations. This can help prevent leakage of corporate and/or customer information.

For brevity, the above described issues and example embodiments were discussed. More embodiments are expected for these and various other use cases in the financial sector.

As mentioned above, there are various configurations to implement an operating environment according to the present invention. However, no limitation is intended by the few exemplary embodiments described herein. For example, there are many embodiments that can be tailored for use in the insurance sector. Methods are necessary to prevent abuses by insurance agents, detect and reduce fraud perpetrated by clients, to provide non-repudiation of claim and payout information, etc. Some sample embodiments include contactless smart cards, contact smart cards, swipe cards, and USB devices, such as the USB device 60. Other form factors are possible and expected.

There is a substantial rise in fraud perpetrated by insurance agents. Some frauds include premium diversion and fee churning. To date there are few methods to detect and counter these actions. To mitigate these and related insurance agent frauds, an embodiment can be tailored that tracks the activities of an insurance agent and builds a history of their activities. This provides several benefits. First, the agent cannot claim that they did not authorize a transaction (assuming use of feature F). Second, the agent cannot easily steal or transfer money without logging and/or audit trails becoming evident. Third, conspirators working with a fraudulent agent will become evident over a period of time.

An embodiment can provide these services by implementing features D, E, F, and K. By implementing feature D, the embodiment protects itself from tampering by agents, hackers, or others, such that deletion of logging and/or audit data cannot be performed. By implementing feature E, the embodiment's hardware, firmware, and software unite to enforce a secure environment that can automatically respond to perceived threats. By implementing feature F, the embodiment can provide a high level of confidence that a client authorized all activities carried out within the operating environment and non-repudiation guarantees can be ascertained. By implementing feature K, the embodiment sets the client's interface to a restricted format, preventing the client from gaining access to restricted resources.

A need for insurance clients to file claims, access claim information, and review claim results is necessary. However, a method of ensuring a client cannot later argue they did not provide the claim information is also necessary. An embodiment can be created that provides clients with secure remote access to claim information while simultaneously providing non-repudiation of claim information.

An embodiment can provide these capabilities by implementing features C, F, and K. By implementing feature C, the client can have a restricted view of claim information such that they cannot modify already signed data. Instead, they may be allowed to update the information but the original information will remain in the system thus providing an update history of claim information. By implementing feature F, the client could be required to provide biometric and location information as well as a reason for accessing the claims system. This information can be used to digitally sign data entered into the system such that non-repudiation can be guaranteed. By implementing feature K, a client can have the same user interface regardless of their location. This reduces chances that a client will mistakenly enter bad information into the system. Additionally, this feature will reduce the client's learning curve for this system.

For brevity, the above described issues and sample embodiments were discussed. More embodiments are expected for these and various other use cases in the insurance sector.

The medical industry is under constant strain to keep up with HIPPA and other regulations. Additionally, this industry is attempting to go high-tech to provide cutting-edge capabilities. While there are secure methods of accessing resources (such as using SSL-enabled websites), these do not provide guarantees that the host accessing these resources is secure. Thus, a weakness in the host can expose patient information to a hacker or other malicious entity. There are several embodiments that are tailored to the medical industry. One embodiment provides medical professionals with secure access to patient information while traveling or otherwise mobile. Another embodiment provides medical professionals with secure communications with patients and other medical professionals while mobile such as from work, from home, etc. A third embodiment provides patients with secure access to medical/insurance payment history, treatment/diagnosis information, etc. A forth embodiment allows medical professionals to securely observe, assist, or perform medical procedures remotely.

Medical professionals are always on the go. As such, there is a need to work in a mobile environment. If an emergency occurs with a patient, a medical professional may need to quickly look up the patient's medical history, recent treatments, and other information. Oftentimes, the medical professional does not have the flexibility to get back to the office or hospital to look up this information. An additional complication is that HIPPA and other restrictions prohibit the casual email or other transmissions of patient information in a non-compliant manner. A method that provides medical professionals secure on-the-go access to patient information is to implement a HIPPA-compliant embodiment.

An embodiment can provide the medical community with such a capability. This embodiment could implement features C, D, E, F, and L, as well as incorporating HIPPA-compliant capabilities. By implementing feature C, the embodiment can provide the medical professional with abbreviated views of information, special formatting of information, and message-transmission capabilities. These would supply a medical professional with the information they need without compromising patient confidentiality. By implementing feature D, the embodiment ensures that HIPPA and other regulations are enforced. Additionally, compromise and/or tampering of the device would be detectable and render the device inoperable, providing additional assurance that no patient or other medical information will be compromised. By implementing feature E, the embodiment guarantees that hardware, firmware, and software components cannot be tampered with or modified without destruction of the information on the device and notification to the embodiment holder. By implementing feature F, the embodiment guarantees that only the legitimate medical professional can authenticate and access patient information. By implementing feature L, access to a hospital or other closed-system can be granted without exposing that entity to outside attacks.

Cell phones have provided a partial solution to the communication challenges faced by medical professionals. However, medical professionals normally do not give out their cell phone numbers to patients and oftentimes these medical professionals are parts of huge networks causing organizational nightmares. A method of facilitating secure communication between medical professionals and between a medical professional and their patients is necessary. An embodiment can be customized for this task.

An embodiment can implement features C, D, E, F, and H, as well as incorporating HIPPA-compliant capabilities. By implementing feature C, the embodiment can provide the medical professional with a restricted communications system that has a secure interface to handle medical-professional-to-patient communication and medical-professional-to-medical-professional communication. By implementing feature D, the embodiment ensures that HIPPA and other regulations are enforced. Additionally, compromise and/or tampering of the device would be detectable and render the device inoperable, providing additional assurance that no patient or other medical information will be compromised. By implementing feature E, the embodiment guarantees that hardware, firmware, and software components cannot be tampered with or modified without destruction of the information on the device and notification to the embodiment holder. By implementing feature F, the embodiment guarantees that only the legitimate medical professional can authenticate and communicate with a patient or other medical professional. By implementing feature H, the embodiment can be configured to allow transmittal of files and other data between medical professionals while ensuring such information is not accidentally provided to a patient.

Currently, it is difficult for many patients to gain access to their payment history, treatment information, and other medical resources. This is compounded by the mobile nature of society. A method of providing patients with access to this information is necessary to ensure that patients have the information necessary to carry out their treatment regimen and pay their bills.

An embodiment that provides these services can implement features A, E, F, H, and I, as well as incorporating HIPPA-compliant capabilities. By implementing feature A, the embodiment takes precautions to limit the potential for patient attacks against the embodiment. By implementing feature E, the embodiment guarantees that hardware, firmware, and software components (including HIPPA restrictions) are locked-down at manufacture time, mitigating the effects of hackers or malicious entities from gaining access to a patient's information. By implementing feature F, the embodiment ensures only a legitimate patient can activate a particular patient's operating environment. By implementing feature H, an embodiment can limit the display of information to a patient. By implementing feature I, the embodiment protects the hospital or other medical facility from potential attack by an unhappy patient or other malicious entity.

In the future medical professionals will desire a capability to securely observe, assist, and perform medical procedures at anytime from anywhere. However, no capability yet exists that meets HIPPA and other regulations and provides the capability to securely perform those tasks in a verifiable manner.

An embodiment that accomplishes those tasks can implement features D, E, F, G, H, K, and L, as well as incorporating HIPPA-compliant capabilities. By implementing feature D, the embodiment ensures that HIPPA and other regulations are enforced. Additionally, compromise and/or tampering of the device would be detectable and render the device inoperable, providing additional assurance that no medical procedure information and/or patient information will be compromised. By implementing feature E, the embodiment guarantees that hardware, firmware, and software components cannot be tampered or modified without destruction of the information on the device and notification to the embodiment holder. By implementing feature F, the embodiment guarantees that only the legitimate medical professional can authenticate and access the system. This ensures that only the doctor or other medical professional scheduled to observe or perform a remote procedure can access the system. By implementing feature G, various combinations of hardware, firmware, and software are possible that can facilitate the particular medical procedure underway. By implementing feature H, an embodiment can provide a medical professional with the ability to customize their view of the medical procedure (such as zooming into specific regions, etc.). If performing the procedure, the medical professional can have all observer views focus on a particular area (helpful for medical students, etc.). By implementing feature K, a uniform access method for a particular medical professional class can be designated. Additionally, this can be restricted to apply only to one hospital or entity. Alternately, it could be expanded to apply to all hospitals or entities within a particular jurisdiction. This would be helpful should legislation be passed requiring a specific view or otherwise limiting this or other medical embodiments. By implementing feature L, an embodiment ensures a hospital or other medical facility's closed system can be accessed by only authorized medical professionals.

For brevity, the above described issues and sample embodiments were discussed. More embodiments are expected for these and various other use cases in the medical sector. An example would be the use of an embodiment to provide attestation of actions ordered by a medical professional and to track the actions actually carried out (e.g., a nurse could use their embodiment when they perform checkups on patients to log the fact that they indeed visited the patient, etc.).

There is a growing need to protect children from online threats. These include active threats like child predators and also passive threats such as accessing inappropriate or unauthorized content. This is exacerbated by the fact that children growing up in a technology dominated world often possess the ability to elude current industry defensive mechanisms such as content filters, web proxies, etc. A method of establishing an acceptable operating environment for children is necessary.

An embodiment that provides these services can implement features A, C, E, and H. By implementing feature A the device's integrity is protected from manipulation by the client. Feature C can provide different datasets and views such as access to school resources, access to learning materials like web encyclopedias, etc. By implementing feature E, this embodiment protects the client by ensuring the device will deactivate itself if a security incident is detected. By implementing feature H this embodiment can display different content while at school, at a library, at home, etc.

Most of the discussion of embodiments has been directed at providing humans with access to resources and capabilities. However, in the security industry, protection mechanisms are only as secure as their weakest link. By implementing embodiments for only humans, this pushes attackers to go after corporate infrastructures and resources. To increase the total security, a short list of embodiments tailored for server and infrastructure systems follows.

Many attacks focus on taking over or otherwise compromising a server within an entity's infrastructure. Often these are web, file, financial, and/or email servers; however, they can be a server offering any sort of service. A security best practice is to harden these servers, which includes minimizing the services each server performs. Firewalls are also used to further restrict the information reaching these servers. Another defense layer is that of an intrusion detection system (IDS) or intrusion prevention system (IPS), which scan for and filter known (or suspected) bad traffic before it reaches the servers. However, attacks inevitably succeed and a compromised server is difficult to detect and correct. Moreover, a false sense of security is often assumed when the aforementioned security countermeasures are used.

By tailoring embodiments for server platforms, service providers can provide a much higher guarantee the proper operation of their systems is maintained. Moreover, hacks and other attacks against the system would be mitigated. Furthermore, a fully-featured embodiment prevents hackers, insiders, and other users from gaining complete control of a critical component.

A server-based embodiment implementing features A, B, C, D, E, G, H, I, and J provides an extremely high confidence that an attacker cannot compromise and maintain control over the server utilizing this embodiment. By implementing feature A, the embodiment can be restricted from allowing any user input to the system. Thus, an attacker cannot enter any information into the system. This can include, but is not limited to, restricting and/or removing all command line applications. By implementing feature B, critical components such as encryption keys, network interfaces, etc. can be protected within an embodiment to ensure those items cannot become compromised. By implementing feature C, the embodiment provides a restricted set of services which can be exposed to network clients, such as restricting the embodiment to delivering web content. By implementing feature D, the embodiment takes action if it detects a compromise or other malicious activity. This can include alerting administrators, temporarily disabling services, etc. By implementing feature E, the embodiment guarantees that no malicious hardware or software components exist. This means that no unauthorized services, backdoors, or other malicious hardware or software components exist within the embodiment that can circumvent all of the other security mechanisms. By implementing feature G, the embodiment is available in various combinations of hardware, firmware, and software providing protection against worms or other automated attacks prevalent today. By implementing feature H, the embodiment forbids unauthorized ports or other unauthorized activity within the server. By implementing feature I, the embodiment ensures that any misconfigured or otherwise weakened embodiment will be restricted from attacking other embodiments or the corporate infrastructure. By implementing feature J, the embodiment restricts access to local hardware. This can mean restricting the server to read-only access to internal hard drives, no access to internal hard drives, no access to any permanent storage, etc. By combining these features into a single secure embodiment, the server end of a communication channel can be secured.

While this section has focused on a sample server embodiment implementation, it is important to note that a client embodiment is not necessary for a server embodiment to be successful. Here is an example to reinforce this notion. A server embodiment can protect a corporation's infrastructure and resources with or without an associated client embodiment. The server embodiment can function as though it were any other server device available in the marketplace. The services provided by standard servers and secured server embodiments would appear identical to clients and thus a high level of transparency exists. However, since a service (or services) provided by a server-based embodiment provide many features not available today, the level of trust in the system is substantially higher.

By tailoring embodiments for infrastructure devices and components such as routers, switches, etc. service providers can provide a much higher guarantee the proper operation of their systems is maintained. Moreover, hacks and other attacks against these types of systems would be mitigated. Furthermore, a fully-featured embodiment prevents hackers, insiders, and other users from gaining complete control of a critical infrastructure component.

An infrastructure device-based embodiment implementing features A, B, C, D, E, F, G, H, I, and J provides an extremely high confidence that an attacker cannot compromise and maintain control over the component utilizing this embodiment. By implementing feature A, the embodiment can be restricted from allowing any user input to the system except via authorized control mechanisms. Thus, an attacker attempting to compromise the embodiment from a remote location cannot enter any information into the system. This can include, but is not limited to, restricting and/or removing all shell applications. By implementing feature B, critical components such as encryption keys, network interfaces, etc. can be protected within an embodiment to ensure those items cannot become compromised. By implementing feature C, the embodiment provides a restricted set of services which can be exposed to network clients, such as restricting the embodiment to transferring data from one network interface to another. By implementing feature D, the embodiment takes action if it detects a compromise or other malicious activity. This can include alerting administrators, temporarily disabling services, etc. By implementing feature E, the embodiment guarantees that no malicious hardware or software components exist. This means that no unauthorized services, backdoors, or other malicious hardware or software components exist within the embodiment that can circumvent all of the other security mechanisms. By implementing feature F, the embodiment can be restricted from access by users that do not meet the various enhanced multi-factor authenticators (such as what you are or why you are). By implementing feature G, the embodiment is available in various combinations of hardware, firmware, and software providing protection against worms or other automated attacks prevalent today. By implementing feature H, the embodiment forbids unauthorized ports or other unauthorized activity within the server, which may include backdoors, etc. By implementing feature I, the embodiment ensures that any misconfigured or otherwise weakened embodiment will be restricted from attacking other embodiments or the corporate infrastructure. By implementing feature J, the embodiment restricts access to local hardware. This can mean restricting the server to read-only access to internal hard drives, no access to internal hard drives, no access to any permanent storage, etc. By combining these features into a single secure embodiment infrastructure components necessary for data transfers via networks, etc. can be secured.

There are many embodiments that can be tailored to environments that may appear unrelated to the technologies protected by this document. This section describes a couple of these embodiments and their applicability. Additionally, other embodiments exist for other environments not described within this document. However, for brevity only the ones listed below are explained in detail.

An embodiment can be used to function as an automobile access and operating key. This can provide several benefits. First, a lost or stolen embodiment could not be used to unlock or activate the associated vehicle. Second, several family members can receive different sets of controls. For example, the parents could have 24-hour access whereas children could have access from 7 AM to 4 PM. However, the car would probably not be configured to auto-halt at the timeout period for obvious safety reasons.

An embodiment that provides these capabilities could implement features A, D, and F. By implementing feature A, the embodiment takes precautions to prevent a malicious client from attempting to defeat the security measures of the system. This is specifically targeted to prevent thieves from stealing an embodiment and successfully gaining access to and operation of a vehicle. By implementing feature D, the embodiment performs self-detection of hardware, firmware, and/or software changes and disables itself when an anomaly occurs. By implementing feature F, the embodiment relies on enhanced multi-factor authenticators to operate the automobile.

Various entities rely on security guards, employees, and others to make rounds to check various key locations. In the case of security guards, the checklist may be all standard, emergency, and loading doors. In the case of a grocery store, an employee may have to visit each of the major product regions. A method is necessary to provide attestation that the individual responsible for making the rounds actually completed the task.

An embodiment that provides these capabilities could implement features B and F. By implementing feature B, the embodiment could be entirely self-intact. No outside power or other resources would be necessary for the embodiment to function. Also, the embodiment could be contact or contactless in nature. By implementing feature F, the biometrics of the authorized client would be required in order to successfully mark off an assigned task. So a friend or associate could not take another person's embodiment and sign off on the tasks for them.

Further, an embodiment may support public key encryption and/or symmetric key encryption. These mechanisms can be supported through hardware implementations, hardware and software implementations, or software-only implementations.

Embodiments can have multiple functions or uses. For example, a client could have a financial embodiment capable of providing identity protection, authorizing secure online transactions, and digitally signing receipts of merchandise received through the mail. Many other combinations of functions and/or uses within embodiments are possible and are expected as a method to reduce cost and provide ease-of-use for clients.

While client-based and server-based embodiments have been discussed in some detail, other embodiment targets are expected. Some of these include devices that are currently used for security purposes such as firewalls, IDS/IPS, proxies, etc. Other devices include switches, modems, etc. Finally, embodiments can be tailored for any device that uses hardware, firmware, and/or software but benefits from advanced security or operational features such as the ones discussed in this document.

A greater level of security could be achieved by implementing server-based, client-based, and network-based embodiments working together to provide trusted and secure end-to-end communication environments.

Fingerprints were often described as the biometric of choice in various embodiments; however, there are many other biometric samples that are expected in various embodiments including: iris scan, hand geometry scan, facial recognition scan, voice recognition, etc. Some of these other methods are anticipated in environments were higher levels of trust are necessary. Liveness tests are more difficult to fake using more sophisticated biometric measurement capabilities (e.g., iris scan in combination with voice verification, etc.).

A built-in method to authenticate out-of-band communication is possible. Such an implementation is most similar to RSA SecurID™. However, an important distinction is that RSA's products are used to authenticate the client (as their $2^{nd}$ factor authenticator). As implemented in an embodiment, the concept would be used so that a client can validate that a phone call (or other communiqué) is coming from a legitimate service provider. For instance, if suspicious activity triggers an alert at a service provider they can call up the client to validate the activity. When the client receives the phone call, the caller must present the client with the digital code (or similar authenticator) that automatically changes at predefined intervals. If the caller cannot provide the correct code the call may be fraudulent.

The security kernel and operating system selected for a particular embodiment can be any of the commercially available products such as Microsoft Windows™ Apple™ OS, RedHat™ Linux, etc. It can also be a closed system not documented or made available to the general public. The latter implementation may provide extra security because the internal operating mechanisms of the embodiment would not be openly documented thus affording greater assurance that an adversary could not successfully attack the system. None of the possible security kernel or operating systems available is specifically preferred over the others.

Greater security is achievable by restricting the capability for an embodiment to save and/or load persistent data. However, it is expected that certain embodiment clients would desire the ability to save data. As such, an embodiment can be manufactured with either onboard secure (or unsecure) storage or have support for pluggable or otherwise attachable external storage. For instance, a USB device 60 could contain a memory slot that can support an external flash memory stick or other similar external permanent storage media. Similarly, a separate USB device 60 could contain a USB port that can receive a connection from another USB-based memory device. Other combinations are possible. Also, an embodiment can have multiple storage capabilities. In addition, other embodiment types can support internal and external data storage. Finally, an embodiment can be designed to allow access to a client's computing system hardware. This hardware can include hard drives, etc., which act as permanent storage devices.

An embodiment can take advantage of virtualization hardware (when available). This allows an embodiment to load a subset of its operating environment into a virtualized setting to speed up system performance. This is useful when the embodiment is attached to a computing system with significantly faster or otherwise superior hardware components. However, any data, resources, security identifiers, etc. transmitted between the embodiment and the virtualized components should be scrutinized for accuracy, evidence of tampering, etc.

When describing enhanced multi-factor user authentication it is important to understand the distinction between the additional user authentication mechanisms described herein as compared to industry best practice of 2-factor (aka "multi-factor") authentication. The U.S. Federal Financial Institutions Examination Council (FFIEC) specifies that there are up to three categories of authentication factors. From the world wide web using universal resource locator at: ffiec.gov/pdf/authentication_guidance.pdf, "Existing authentication methodologies involve three basic "factors": Something the user knows (e.g., password, PIN); Something the user has (e.g., ATM card, smart card); and Something the user is (e.g., biometric characteristic, such as a fingerprint)." Therefore, the description of additional enhanced factors of authenticating a user should serve to provide notice of additional categories capable of providing differing levels of authentication of users.

Separation of a trusted, secure, and verifiable operating environment into multiple hardware, firmware, and/or software components is possible and expected. An example of this separation could be the use of a biometric scanning device provided external to the embodiment. The embodiment could be a LiveMedia-based device that, when booted, accesses the external biometric scanning device to authenticate a client's biometric information. Another example could be a USB device 60 used in conjunction with a LiveMedia to provide multiple assurances that the read-only (aka "non persistence") feature is guaranteed. In this example, the biometric information could be attained from the USB device 60 and the operating system could be loaded from the LiveMedia.

Various hardware embodiments can implement self-defense mechanisms through physical operations. For instance, a USB device 60 could implement a hardware eject feature whereby the embodiment ejects itself from a USB interface if the client was inactive for a long period of time. This greatly reduces the potential that an unauthorized user (e.g., hacker, etc.) can piggyback on the legitimate client's access. This feature acts in a manner similar to a timeout feature.

The network connection an embodiment can use to connect to a service provider can be secure (IPSec, VPN, etc.) or unsecure. Additionally, the network protocols supported can include TCP/IP, UDP/IP, SPX/IPX, or any others. Also, different versions of these network protocols (e.g., IPv4, IPv6, etc.) can be supported. No protocol or security method is preferred over others and those listed above should not be considered limiting.

Most of the embodiments discussed have been described as single-owner-only devices. However, it is expected and anticipated that organizations will want to have multi-user devices. These devices could be shared by various entities. For example, one device could maintain access permissions for all registered managers. Any manager can successfully authenticate and use this embodiment. Similarly, a married couple may wish to share a single financial or credit-based embodiment for purchases. There are other use cases that would benefit from multi-user embodiments.

A new concept called Biometric on Boot (BOB) is anticipated. BOB requires a user to present their biometric authenticator in order to unlock and activate the boot partition on the device. Modern devices only support biometric security on USB and other devices after the main operating system has loaded or to protect access to BIOS and other system settings. However, these settings only work on the physical system they are implemented on and the effects are not transferable with the client. By implementing BOB, a lost or stolen device is unusable by anyone other than the authorized client and the legitimate client can bring their secure boot environment with them.

The above listed features, the embodiments described, and the diagrams showing specific uses and/or operating modes should be considered as a guide for how to implement various embodiments. The number of embodiments described and the details used to describe them are to establish a broad range of potential use cases. They should not be considered an all-inclusive list of the expected or preferred implementations of various embodiments. Additionally, they should not be considered as limiting the scope or bounds of how and when embodiments can be manufactured and used. Moreover, the sectors (medical, financial, etc.) having specific use cases described herein should not be considered the only ones that an embodiment can protect. It is specifically acknowledged that other sectors can benefit from embodiments containing the above listed features and other features not identified.

The principle of this document is to describe methods of combining various components (hardware, software/firmware, features, etc.) into a trusted, secure, and verifiable operating environment.

The definition of trust, in this context, is a confidence that the embodiment provides the desired services, features, etc. as specified in a contract or similar agreement. It is not necessary to have 100% acceptance by every client, IT personnel, employee, etc. to achieve trust. Trust is a general belief asserted by the organization or person accepting receipt of an embodiment. For instance, an embodiment manufactured in one country may not be considered trusted from the perspective of another country.

The definition of secure, in this context, is a confidence that the embodiment provides protections against adversarial attacks. Moreover, a higher level of security is achievable by implementing more features as discussed above (and other features not discussed herein). It is not necessary to resist 100% of the potential attacks for an embodiment to be secure. For instance, an embodiment manufactured in one country may not be considered secure from the perspective of another country.

The definition of verifiable, in this context, is the assurance that the trusted and secure components within an embodiment meet the build-to or design-to specifications. Verifiability also takes into consideration the ability for an embodiment to verify that an embodiment's implementation has not been compromised or otherwise brought into an inconsistent state. It is not necessary to have a 100% verifiable embodiment capable of maintaining a trusted and secure state; however, the embodiment may take action to disable itself to prevent further compromise of the system and (if programmed as such) provide the client with notification that the embodiment is no longer verifiable and therefore may be neither secure nor trusted.

The definition of an operating environment, in this context, is any combination of hardware, firmware, and/or software that operate to process data or information, produce or calculate a result or information, and/or provide a service. Some modern hardware supports onboard firmware or software capabilities such that external firmware and software are not necessarily bundled within the device. These primarily hardware-based devices should still be considered an operating environment since they are made up of at least one hardware component that processes data or information, produces or calculates a result or information, and/or provides a service.

The embodiments can be implemented in computing hardware (computing apparatus) and/or software, such as (in a non-limiting example) any computer that can store, retrieve, process and/or output data and/or communicate with other devices. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, flash memory, and/or a semiconductor memory (for example, RAM, ROM, etc.). Examples of the magnetic recording apparatus include a hard disk device (HDD), a flexible disk (FD), and a magnetic tape (MT). Examples of flash memory include compact flash, USB flash drives, and solid state drives. Examples of the optical disk include a DVD (Digital Versatile Disc), a DVD-RAM, a CD (Compact Disc), and a CD+R (Recordable), etc. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of providing an operating environment, comprising:
   creating a plurality of security features and assigning identifier for each of the plurality of security features in a device;
   storing said plurality of security features;
   determining signaling, communicating with, and controlling hardware based on one of the security features;
   interacting with a base computer coupled to the device;
   retrieving one security feature from said plurality of security features based on a risk determination for the operating environment in processing a request for a service;
   determining whether to provide a trusted, secure, and verifiable environment by selecting a combination of any of said hardware, software, firmware, and security features of a multi-factor authentication, and
   wherein the combination is enabled to be implemented with at least one component manufactured through a trusted fabrication, the combination is tailored for a service identified in the request and the combination is changeable in response to another request for the service.

2. A method, comprising:
   determining a level of security for an environment relative to a processing of a request;
   interacting with a base computer coupled to a device storing a plurality of security features;
   retrieving one security feature from said plurality of security features based on a risk determination for the operating environment in processing a request for a service;
   processing the request in the environment provided based on the level determined;

determining whether to provide a trusted, secure, and verifiable environment by selecting a combination of any of hardware, software, firmware, and security features of a multi-factor authentication, and wherein the combination is enabled to be implemented with at least one component manufactured through a trusted fabrication, the combination is tailored for a service identified in the request and the combination is changeable in response to another request for the service.

3. The method according to claim 2, wherein the level requires a second combination of security factors for said verifying.

4. The method according to claim 2, wherein the level is selectively adjusted based on a need of a service provider.

5. The method according to claim 2, wherein the level is provided across all environments to which a user has access.

6. The method according to claim 2, wherein a client device is selectively set to operate based on one of a local operating environment, a client, a server, an infrastructure device, or a member of a cluster.

7. The method according to claim 2, wherein a predetermined type of instruction is ignored when received from a client device.

8. The method according to claim 2, where predetermined information is removed from a client device.

9. The method according to claim 2, wherein an enhanced multi-factor authentication is implemented to enable said processing of the request.

10. The method according to claim 2, wherein said verifying controls an operating environment, and determines whether to accept a request to operate an application.

11. The method according to claim 2, comprising:
configuring a client in accordance with a trusted fabrication that undergoes predetermined manufacturing and handling procedures.

12. The method according to claim 2, wherein a service provider establishes pre-existing rules for said verifying.

13. The method according to claim 2, wherein said verifying including obtaining information of multiple factors from at least two different sources.

14. The method according to claim 13, wherein said verifying determines whether the information obtained matches a selected combination of the multiple factors.

15. A non-transitory device-readable storage medium having stored therein a program for causing a computer to execute an operation, comprising:

determining a level of security for an environment relative to a processing of a request;
interacting with a base computer coupled to a device;
retrieving one security feature from a plurality of security features based on a risk determination for the operating environment in processing a request for a service;
processing the request in the environment provided based on the level determined;
determining whether to provide a trusted, secure, and verifiable environment by selecting a combination of any of hardware, software, firmware, and security features of a multi-factor authentication, and
wherein the combination is enabled to be implemented with at least one component manufactured through a trusted fabrication, the combination is tailored for a service identified in the request and the combination is changeable in response to another request for the service.

16. A system, comprising:
a device processing a request;
a processor determining a level of security for an environment relative to the processing of the request;
the processor interacting with a base computer coupled to the device;
retrieving one security feature from a plurality of security features based on a risk determination for the operating environment in processing a request for a service;
processing the request in the environment provided based on the level determined;
determining whether to provide a trusted, secure, and verifiable environment by selecting a combination of any of hardware, software, firmware, and security features of a multi-factor authentication, and
wherein the combination is enabled to be implemented with at least one component manufactured through a trusted fabrication, the combination is tailored for a service identified in the request and the combination is changeable in response to another request for the service.

17. The system according to claim 16, wherein the device is configured in accordance with a trusted fabrication that undergoes predetermined manufacturing and handling procedures.

18. The system according to claim 16, wherein the device is designated as trusted.

* * * * *